(12) United States Patent
Nakayama et al.

(10) Patent No.: US 11,553,652 B2
(45) Date of Patent: Jan. 17, 2023

(54) GRAFTING DEVICE

(71) Applicant: NATIONAL AGRICULTURE AND FOOD RESEARCH ORGANIZATION, Tsukuba (JP)

(72) Inventors: Natsuki Nakayama, Saitama (JP); Keita Yoshinaga, Tsukuba (JP); Loan Thi Thanh Nguyen, Saitama (JP); Takashi Furuyama, Tsukuba (JP); Hitoshi Takahashi, Saitama (JP)

(73) Assignee: NATIONAL AGRICULTURE AND FOOD RESEARCH ORGANIZATION, Tsukuba (JP)

( * ) Notice: Subject to any disclaimer, the term of this patent is extended or adjusted under 35 U.S.C. 154(b) by 272 days.

(21) Appl. No.: 16/089,010

(22) PCT Filed: Mar. 31, 2017

(86) PCT No.: PCT/JP2017/013800
§ 371 (c)(1),
(2) Date: Sep. 27, 2018

(87) PCT Pub. No.: WO2017/171074
PCT Pub. Date: Oct. 5, 2017

(65) Prior Publication Data
US 2019/0110405 A1    Apr. 18, 2019

(30) Foreign Application Priority Data

Mar. 31, 2016  (JP) ................................ 2016-073281
Mar. 31, 2016  (JP) .............................. JP2016-072835

(51) Int. Cl.
*A01G 2/32* (2018.01)
*A01G 2/38* (2018.01)

(52) U.S. Cl.
CPC ................. *A01G 2/32* (2018.02); *A01G 2/38* (2018.02)

(58) Field of Classification Search
CPC ... A01G 2/30; A01G 2/38; A01G 2/32; A01G 2/35
See application file for complete search history.

(56) References Cited

U.S. PATENT DOCUMENTS

| 2,059,812 | A | * | 11/1936 | Scaglione | ................ | A01G 2/30 47/6 |
| 4,839,986 | A | * | 6/1989 | Grantham | ................ | A01G 2/30 47/6 |
| 5,209,011 | A | | 5/1993 | Mori et al. | | |

FOREIGN PATENT DOCUMENTS

| CN | 103053344 A | 4/2013 |
| HU | 199209 B | 2/1990 |

(Continued)

OTHER PUBLICATIONS

International Search Report dated Jun. 27, 2017, issued in counterpart International Application No. PCT/JP2017/013800(2 pages).

(Continued)

*Primary Examiner* — Son T Nguyen
(74) *Attorney, Agent, or Firm* — WHDA, LLP

(57) ABSTRACT

A grafting device includes: a transfer unit configured to transfer, in a predetermined direction, a grafted seedling that is in a state where a cut surface of a graft and a cut surface of a rootstock are closely attached to each other; a tape supply unit configured to arrange a tape on a transfer path of the grafted seedling in such a manner that the tape is allowed to be pulled out; a pull-out member configured to transfer through the transfer path in advance of the grafted seedling to pull out the tape from the tape supply unit, and sandwich a closely attached part of the grafted seedling between a first part of the tape and a second part facing the first part; and a welding unit configured to cover a periphery of the closely attached part of the grafted seedling with the tape and weld the tape.

24 Claims, 29 Drawing Sheets

(56) References Cited

FOREIGN PATENT DOCUMENTS

| | | |
|---|---|---|
| JP | 2-190118 A | 7/1990 |
| JP | 3-58718 A | 3/1991 |
| JP | 4-49937 U | 4/1992 |
| JP | 4-183326 A | 6/1992 |
| JP | 5-30856 A | 2/1993 |
| JP | 6-097919 B2 | 12/1994 |
| JP | 7-135853 A | 5/1995 |
| JP | 8-243859 A | 9/1996 |
| JP | 2004-159518 A | 6/2004 |
| JP | 3536150 B2 | 6/2004 |
| JP | 2004-350548 A | 12/2004 |
| JP | 2004-359287 A | 12/2004 |
| JP | 2005-143332 A | 6/2005 |
| JP | 3127222 U | 11/2006 |
| JP | 2008-68886 A | 3/2008 |
| JP | 2012-205547 A | 10/2012 |
| JP | 2014-73091 A | 4/2014 |
| JP | 2014-93990 A | 5/2014 |
| JP | 2015-12831 A | 1/2015 |
| KR | 10-2010-0044582 A | 4/2010 |
| SU | 1391537 A1 | 4/1988 |
| WO | 2011/107943 A1 | 9/2011 |

OTHER PUBLICATIONS

Office Action dated Mar. 18, 2020, issued in counterpart Application No. 201780021487.3, with English translation (16 pages).

Office Action dated Nov. 26, 2019, issued in counterpart KR Application No. 10-2018-7027603, with English translation. (18 pages).

Extended (supplementary) European Search Report dated Mar. 13, 2019, issued in counterpart EP Application No. 17775605.3. (6 pages).

* cited by examiner

GRAFTING DEVICE

TECHNICAL FIELD

The present invention relates to a grafting device.

BACKGROUND ART

As a countermeasure against soil borne pathogen and a measure to increase a yield, the use of grafting is increasing worldwide. A substantially C-shaped tube (see Patent Document 1 or the like), an adhesive tape (see Patent Documents 2 through 4 or the like), heat-shrinkable plastic (see Patent Document 5 or the like), stretch non-woven cloth (see Patent Document 6 or the like) or a clip (see Patent Document 7 or the like) has been conventionally used as a joint material for joining a rootstock and a graft in grafting.

PRIOR ART DOCUMENT

Patent Document

[Patent Document 1] Japanese Patent Application Publication No. 2014-93990
[Patent Document 2] Japanese Patent Application Publication No. H04-183326 [Patent Document 3] Japanese Patent Application Publication No. 2004-159518
[Patent Document 4] Japanese Patent Application Publication No. H03-58718
[Patent Document 5] Japanese Patent Application Publication No. H05-30856
[Patent Document 6] Japanese Patent Application Publication No. 2005-143332
[Patent Document 7] Japanese Patent Application Publication No. 2012-205547

SUMMARY OF THE INVENTION

Problems to be Solved by the Invention

However, when a C-shaped tube is used, it is necessary to prepare several tubes having diameters appropriate to the shaft diameters of rootstocks and grafts, and select appropriate one. Thus, if the C-shaped tube is used as a joint material in automation of grafting, the device may become complex.

When an adhesive tape is used, the adhesive agents may fail to function because trichome is sandwiched between the tapes when used to nursery plants having trichome around the hypocotyl such as tomato plants. In addition, when the joined part has water, or during nurturing process under high humidity after grafting, the adhesive agents may fail to function. In addition, since the adhesive agents are used, the adhesive tape is difficult to handle, and is not suitable for the joint material in automation of grafting.

When heat-shrinkable plastic is used, since heating treatment is necessary, there is a concern that the heat affects the nursery plant. When stretch non-woven cloth is used, since the non-woven cloth has ventilation characteristics and water retention characteristics, a root grows from a graft, and a grafted plant may not take root.

When nursery plants of vegetables are grafted with clips, the joint state is good. However, since the stem of a vegetable is soft, the weight of the clip may bend the stem of the grafted plant after fastening of the grafted plant. Additionally, the clip is more expensive than other joint materials, but users desire to reduce costs for materials.

As described above, there are various problems with joint materials for grafting that have been used or suggested. In addition, in recent years, it becomes difficult to secure workers who perform a grafting operation. Thus, the grafting operation is mechanized to solve the problem. The present invention aims to provide a grafting device capable of achieving automation of grafting by a simple structure in a method of fastening a grafted seedling by ultrasonic welding of a tape.

Means for Solving the Problems

A grafting device of the present invention includes: a transfer unit configured to transfer, in a predetermined direction, a grafted seedling that is in a state where a cut surface of a graft and a cut surface of a rootstock are closely attached to each other; a tape supply unit configured to arrange a tape on a transfer path of the grafted seedling in such a manner that the tape is allowed to be pulled out; a pull-out member configured to transfer through the transfer path in advance of the grafted seedling to pull out the tape from the tape supply unit, and sandwich a closely attached part of the grafted seedling between a first part of the tape and a second part facing the first part; and a welding unit configured to cover a periphery of the closely attached part of the grafted seedling with the tape and weld the tape.

A grafting device of the present invention includes: a rotating table configured to rotate around a rotating shaft; a hold unit configured to hold a graft and a rootstock in an outer peripheral portion of the rotating table; a tape supply unit configured to arrange a tape on a transfer path of a grafted seedling that is in a state where cut surfaces of the graft and the rootstock are closely attached to each other in such a manner that the tape is allowed to be pulled out, the tape being made of thermoplastic resin; a sandwiching mechanism configured to pull out the tape from the tape supply unit and sandwich a closely attached part of the grafted seedling between a first part of the tape and a second part facing the first part; and a welding unit configured to ultrasonically weld the first part and the second part of the tape to cover a periphery of the closely attached part of the grafted seedling.

Effects of the Invention

The grafting device of the present invention has an advantage capable of achieving automation of a grafting operation with a simple structure in a method of fastening a grafted seedling by ultrasonic welding of a tape.

MODES FOR CARRYING OUT THE INVENTION

Hereinafter, a description will be given of an embodiment of a grafting device based on FIG. 1 through FIG. 14B.

Figure 1:
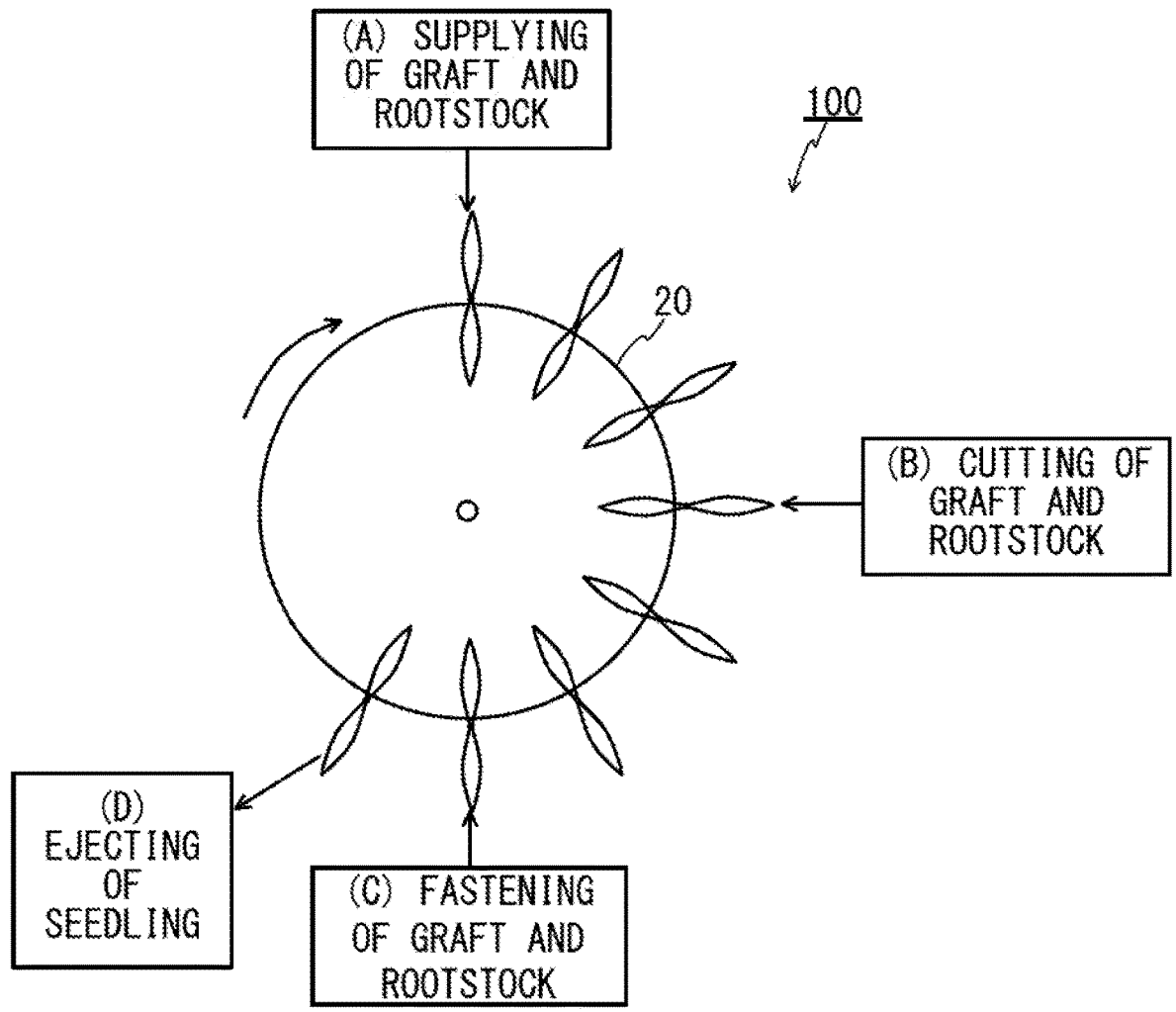
FIG. 1 is a diagram illustrating an overview of a grafting device in accordance with an embodiment.

FIG. 1 illustrates an overview of a grafting device 100 of the present embodiment. As illustrated in FIG. 1, the grafting device 100 includes a rotating table 20 as a transfer unit, and is a device that automatically performs grafting by sequentially conducting four processes: a "(A) supplying of graft and rootstock" process; a "(B) cutting of graft and rootstock" process; a "(C) fastening of graft and rootstock" process; and a "(D) ejecting of joined seedling" process, to the rotating table 20 that intermittently rotates by 30° in a clockwise direction.

Figure 2:
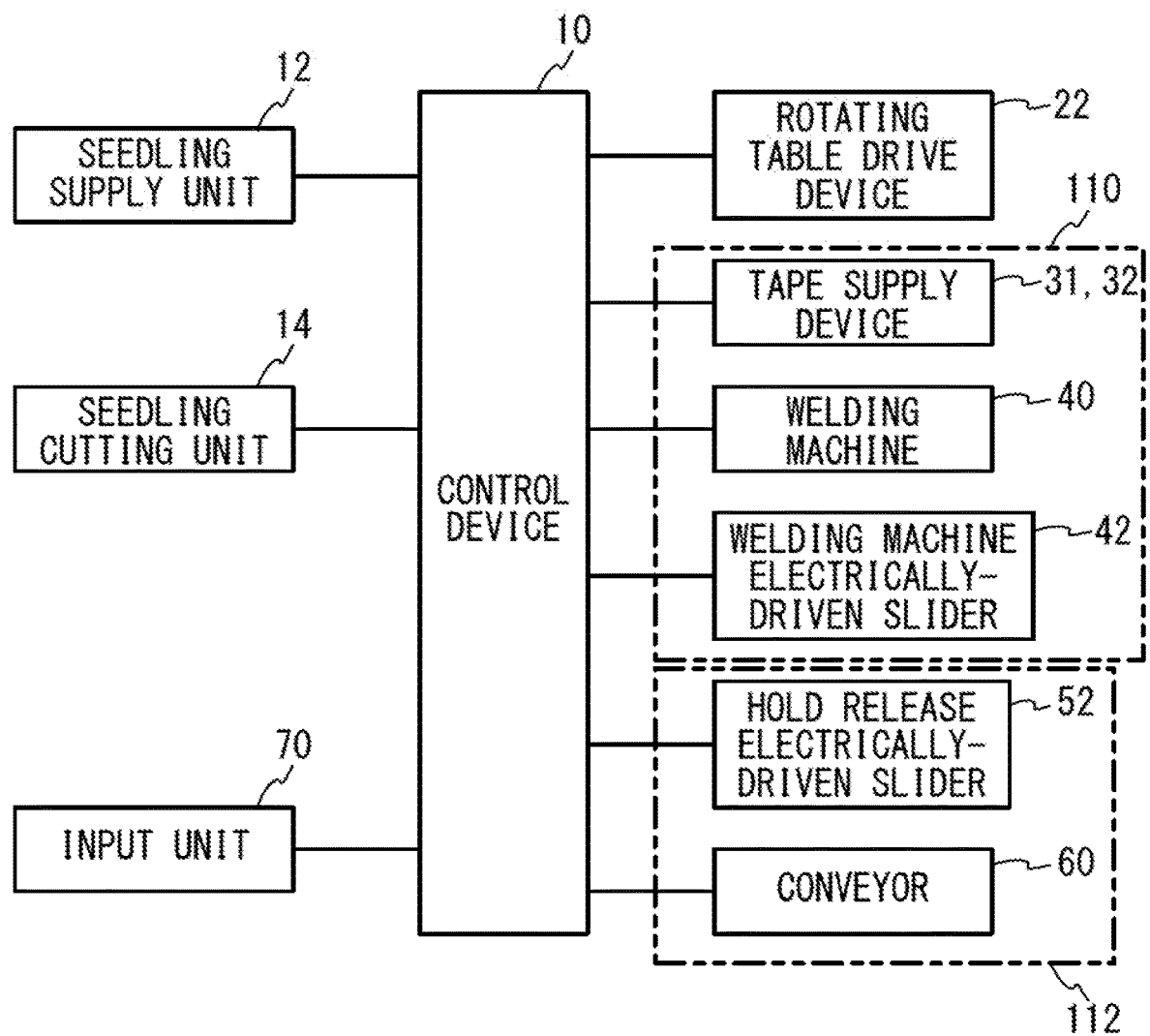
FIG. 2 is a block diagram of the grafting device.

FIG. 2 is a block diagram of the grafting device 100. In the present embodiment, a seedling supply unit 12 in FIG. 2 conducts the "(A) supplying of graft and rootstock" process, a seedling cutting unit 14 conducts the "(B) cutting of graft and rootstock" process, a seedling joining unit 110 conducts the "(C) fastening of graft and rootstock" process, and a seedling ejection unit 112 conducts the "(D) ejecting of joined seedling" process. In the "(B) cutting of graft and rootstock" process, conducted are steps for bringing the cut surface of a graft and the cut surface of a rootstock into a closely attached state. After the "(B) cutting of graft and rootstock" process, the graft and the rootstock are transferred while being in a state of a grafted seedling with the graft and the rootstock closely attached. In the "(C) fastening of graft and rootstock" process, the closely attached part of the transferred grafted seedling is covered with a joint material so that the closely attached surfaces do not shift (hereinafter, referred to as "fastening").

Figure 3:
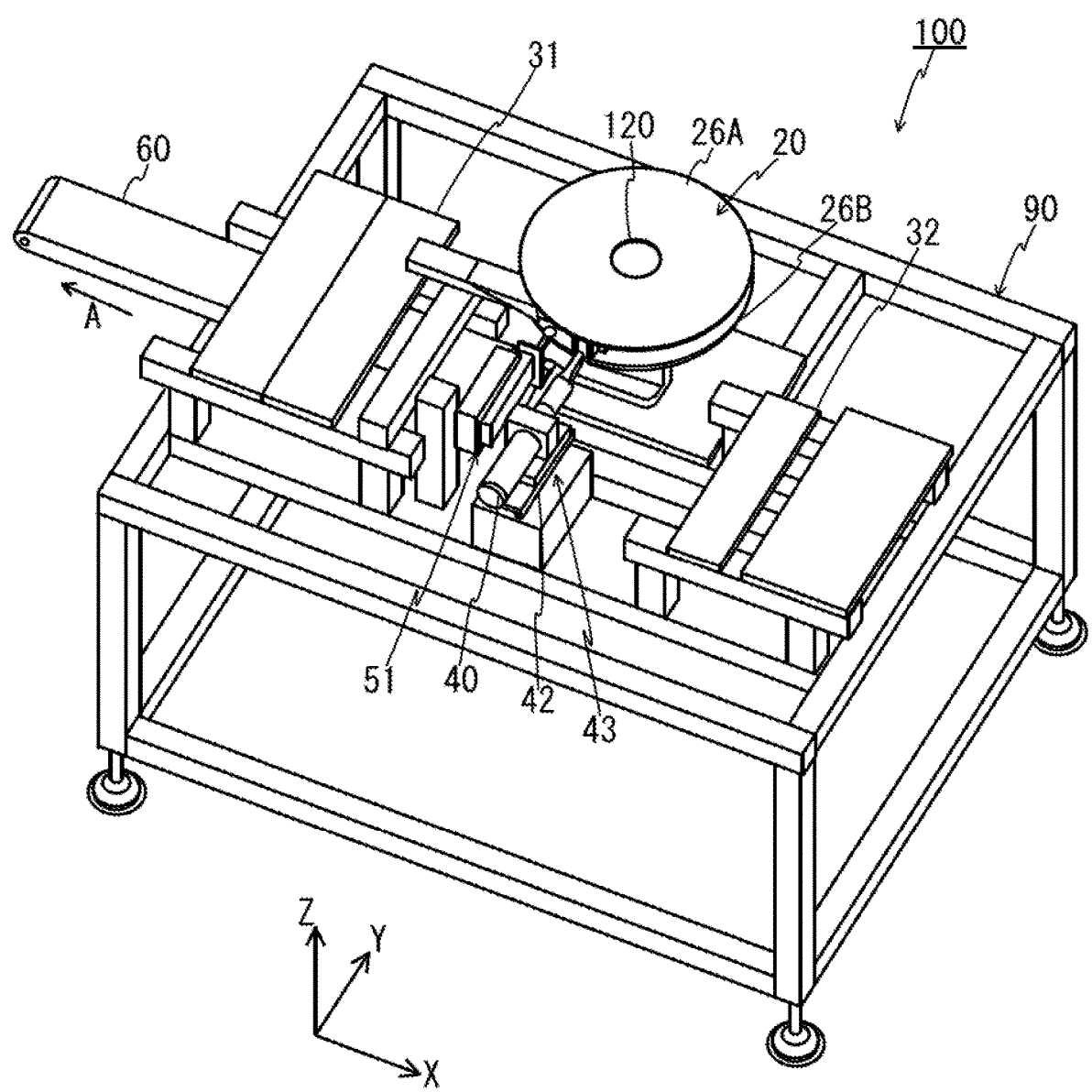
FIG. 3 is a perspective view schematically illustrating the grafting device.

FIG. 3 is a perspective view schematically illustrating the grafting device 100. As illustrated in FIG. 3, the grafting device 100 includes a base portion 90 formed of an aluminum frame, the rotating table 20 located on the base portion 90, tape supply devices 31 and 32 as a tape supply unit, a welding unit 43, a hold release mechanism 51, a conveyor 60, and a control device 10 (see FIG. 2). In FIG. 3, the illustration of the seedling supply unit 12, the seedling cutting unit 14, and the like, which are illustrated in FIG. 2, is omitted. The seedling supply unit 12 and the seedling cutting unit 14 can be implemented by existing technology.

The rotating table 20 includes an upper table 26A and a lower table 26B. The upper table 26A and the lower table 26B are disc-like members having identical diameters, and are fixed to a rotating shaft 120 at a predetermined interval in the vertical direction (the Z-axis direction in FIG. 3). A rotating table drive device 22 illustrated in FIG. 2 intermittently rotates the upper table 26A and the lower table 26B by 30° in the clockwise direction at predetermined time intervals.

Figure 4:
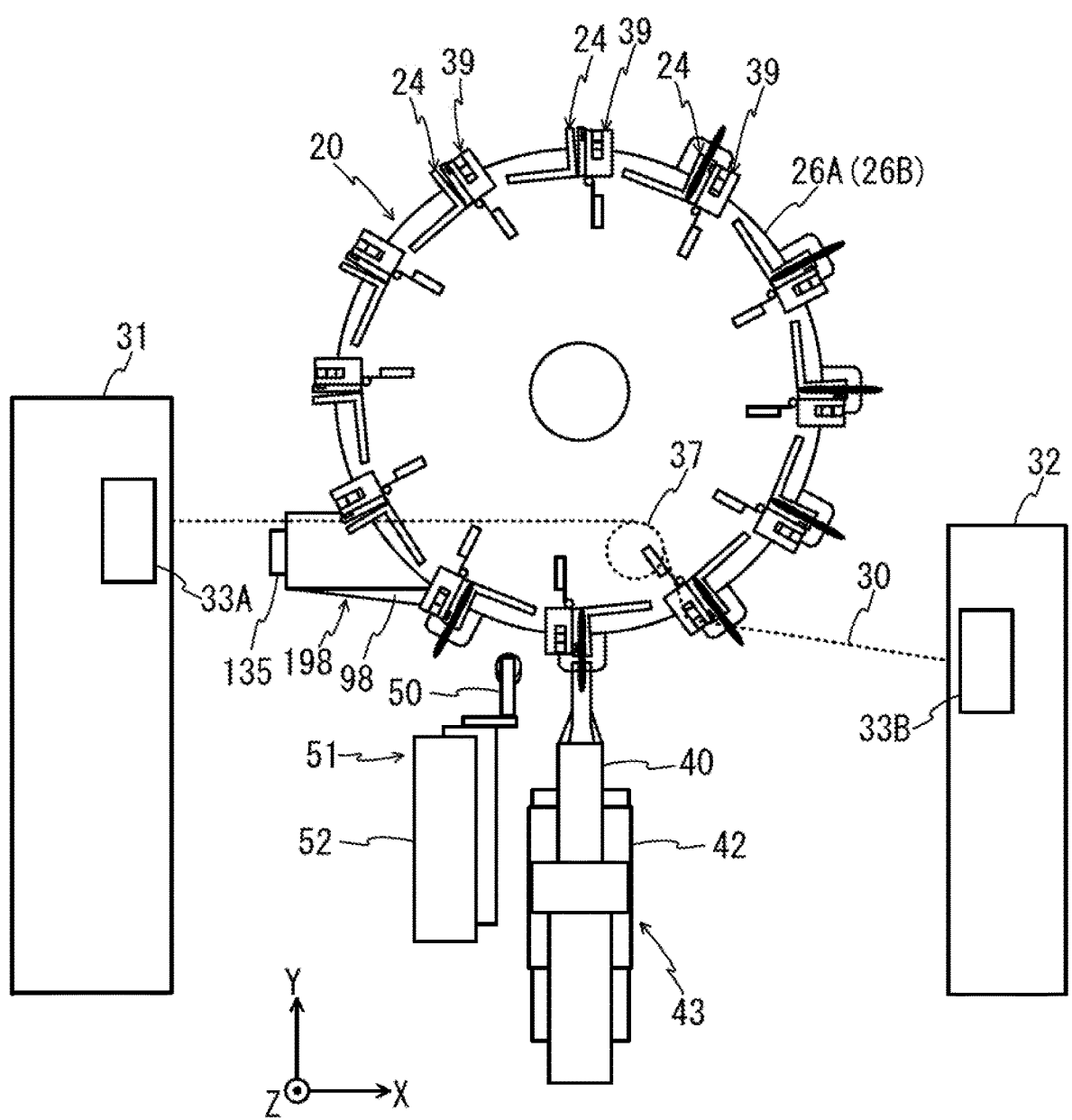
FIG. 4 is a plan view of the vicinity of an upper table.

FIG. 4 is a plan view of the vicinity of the upper table 26A. As illustrated in FIG. 4, in the vicinity of the outer peripheral portion of the upper surface (the +Z surface) of the upper table 26A, hold mechanisms 24 as hold units are arranged at intervals of 30° (not illustrated in FIG. 3 for the convenience sake). Hold mechanisms 124 as hold units are also arranged in the vicinity of the outer peripheral portion of the lower surface (the −Z surface) of the lower table 26B at intervals of 30° (see FIG. 6). The hold mechanism 24 arranged on the upper table 26A holds a graft 102 used for grafting, while the hold mechanism 124 arranged on the lower table 26B holds a rootstock 104 (see FIG. 6). The positions of the hold mechanism 24 arranged on the upper table 26A and the hold mechanism 124 arranged on the lower table 26B are adjusted so that the hold mechanism 24 holds the graft 102, the hold mechanism 124 holds the rootstock 104, and a grafted seedling 103 is in a state where the cut surfaces of the graft 102 and the rootstock 104 are closely attached to each other. That is, the positions of the hold mechanism 24 and the hold mechanism 124 are adjusted so that the axial center position (the center position of the stem) of the graft 102 held by the hold mechanism 24 is substantially aligned with the axial center position (the position of the central axis of the stem) of the rootstock held by the hold mechanism 124. Since the grafted seedling 103 transfers as the rotating table 20 rotates, the transfer path of the grafted seedling 103 is a path along the outer periphery of the rotating table 20.

Figure 5:
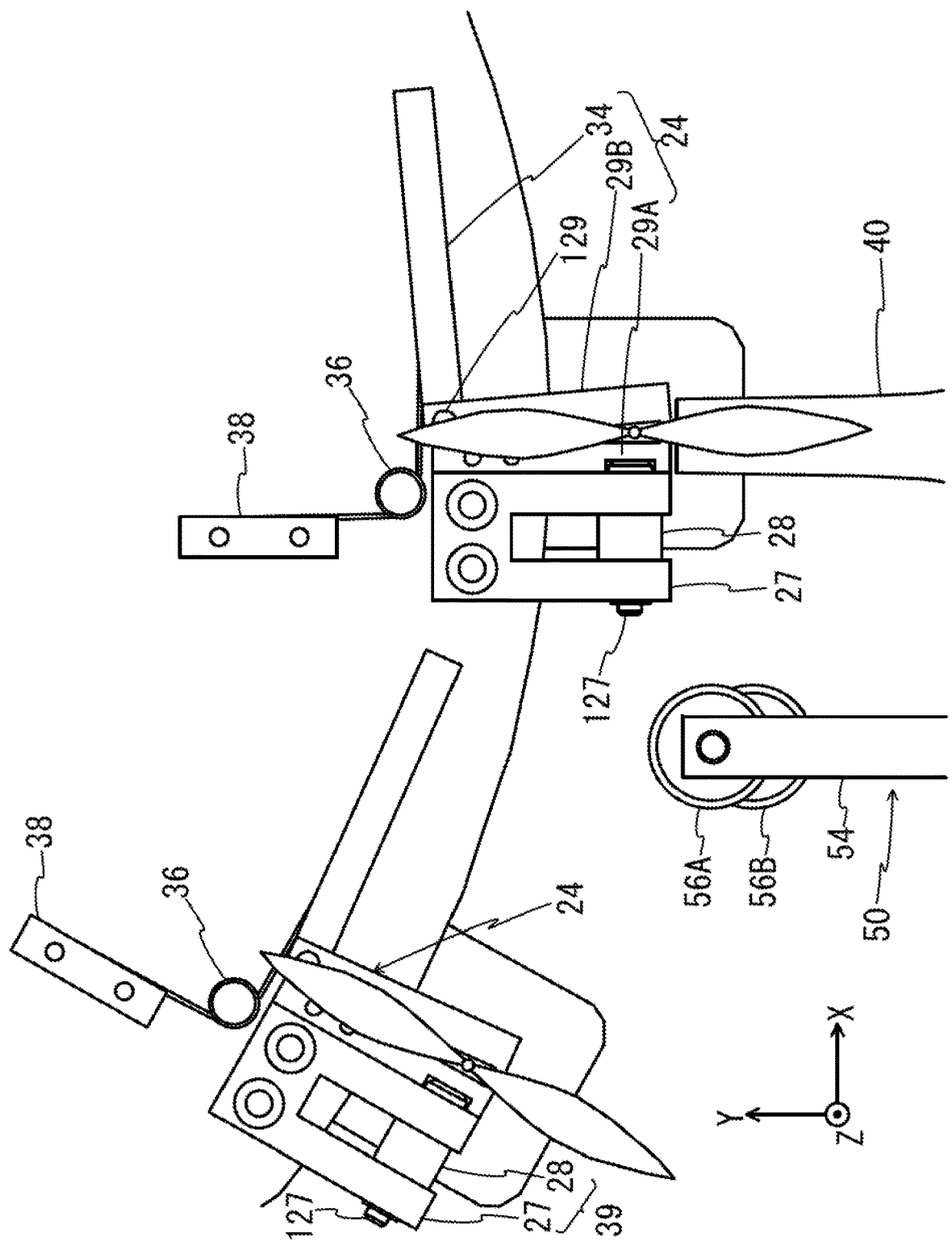
FIG. 5 is an enlarged plan view of the vicinity of a hold mechanism.
Figure 6:
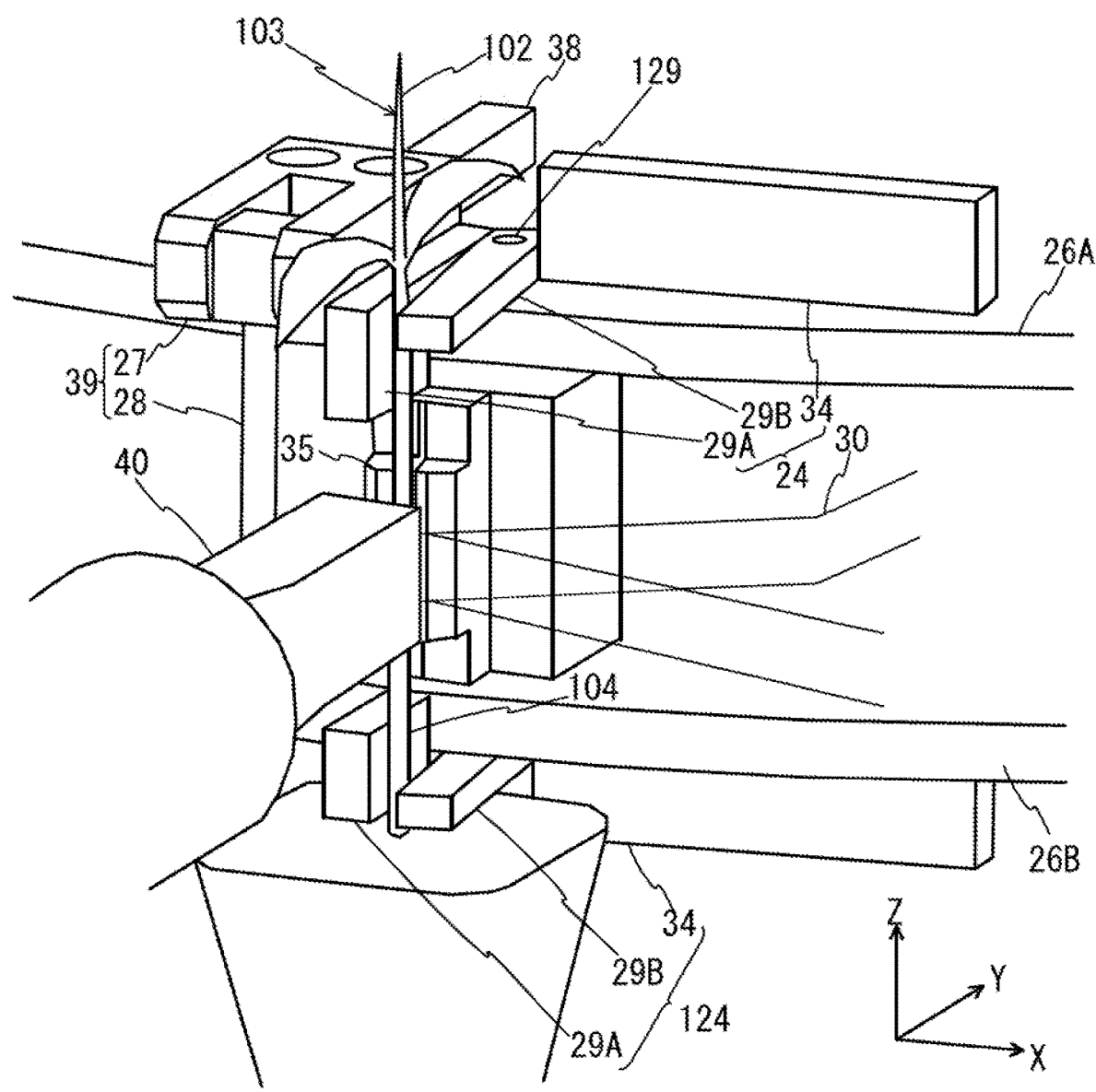
FIG. 6 is a perspective view of the vicinities of the hold mechanism and a welding machine.

FIG. 5 is an enlarged plan view of the vicinity of the hold mechanism 24, and FIG. 6 is a perspective view of the vicinities of the hold mechanisms 24 and 124 and a welding machine 40. As illustrated in FIG. 5 and FIG. 6, the hold mechanism 24 includes a first hold portion 29A, a second hold portion 29B, a force applying portion 34, a torsion spring 36, a block member 38, and a shaft 129. The first hold portion 29A is fixed on the upper surface of the upper table 26A. The second hold portion 29B is located on the upper surface of the upper table 26A through the shaft 129. This structure allows the second hold portion 29B to rotate around the Z-axis centering around the shaft 129. The force applying portion 34 is fixed to the vicinity of the shaft 129 of the second hold portion 29B.

As illustrated in FIG. 5, the torsion spring 36 is located between the force applying portion 34 and the block member 38 fixed on the upper surface of the upper table 26A. The elastomeric force of the torsion spring 36 always applies a clockwise force centering around the shaft 129 to the force applying portion 34 and the second hold portion 29B. This structure allows the graft 102 to be held (sandwiched) between the second hold portion 29B and the first hold portion 29A while the hold release unit 50 is not in contact with the force applying portion 34. Adversely, when a force in the +Y direction is applied from the hold release unit 50 to the force applying portion 34, the force applying portion 34 and the second hold portion 29B rotate around the shaft 129 in the counterclockwise direction, and release the graft 102 that has been held.

The hold mechanism 124 has the same structure as the hold mechanism 24 described previously. That is, as illustrated in FIG. 6, the hold mechanism 124 includes the first hold portion 29A, the second hold portion 29B, and the force applying portion 34, and includes a torsion spring (not illustrated), a block member (not illustrated), and a shaft (not illustrated) as with the hold mechanism 24.

The positions of the hold mechanisms 24 and 124 in a state where the rotating table 20 is stopped correspond to the positions of the numbers on the dial plate of a clock as illustrated in FIG. 4. Thus, in the description hereinafter, the positions of the hold mechanism 24 and 124 located at the most +Y side in FIG. 4 are referred to as a "position of 12 o'clock", the position shifted by 30° in the clockwise direction from the position of 12 o'clock is referred to as a "position of 1 o'clock", and the position shifted by 30° in the clockwise direction from the position of 1 o'clock is referred to as a "position of 2 o'clock". That is, the position at the most −Y side (the position facing the welding machine 40) is a "position of 6 o'clock". In the present embodiment, as an example, as illustrated in FIG. 1, the "(A) supplying of graft and rootstock" process is performed on the hold mechanisms 24 and 124 at the position of 12 o'clock, and the "(B) cutting of graft and rootstock" process is performed on a graft and a rootstock held by the hold mechanisms 24 and 124 at the position of 3 o'clock. The "(C) fastening of graft and rootstock" process is performed on a graft and a rootstock held by the hold mechanisms 24 and 124 at the position of 6 o'clock, and the "(D) ejecting of seedling" process is performed on the hold mechanisms 24 and 124 at the position of 7 o'clock.

Figure 7:
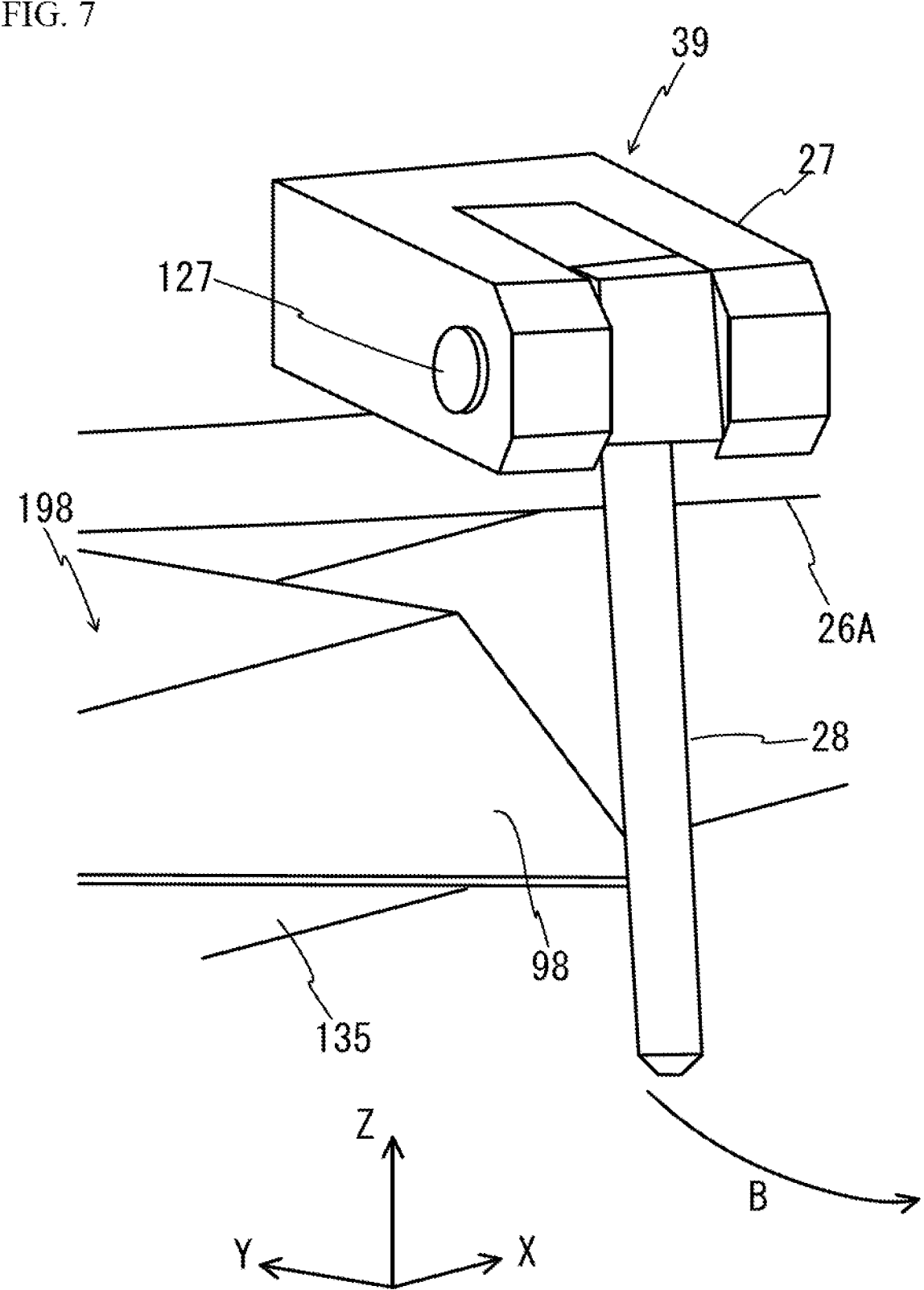
FIG. 7 is a perspective view of a tape pull-out mechanism.

As illustrated in FIG. 4, a tape pull-out mechanism 39 is located in the vicinity of each of the hold mechanisms 24 (anterior to each hold mechanism 24 in the clockwise direction) on the upper surface of the upper table 26A. FIG. 7 is an enlarged perspective view of the tape pull-out mechanism 39. As illustrated in FIG. 7, the tape pull-out mechanism 39 includes a fixed member 27 having a substantially U-shape as viewed from the +Z direction, and a pin 28 as a pull-out member provided to a rocking shaft 127 of the fixed member 27. The rocking shaft 127 is a shaft extending in the tangential direction of the outer periphery of the upper table 26A. The pin 28 is provided to the rocking shaft 127, and is able to swing in the direction indicated by an arrow B (outward in the radial direction of the rotating table 20, i.e., the circumferential direction), but is unable to swing in other directions. Since the pin 28 transfers as the rotating table 20 rotates, if the pin 28 does not swing, the transfer path of the pin 28 is a path along the outer periphery of the rotating table 20.

As indicated by dashed lines in FIG. 4, the tape supply devices 31 and 32 supply a thermoplastic resin tape 30 in such a state that the thermoplastic resin tape 30 crosses the transfer paths of at least the pin 28 and the grafted seedling 103. In the present embodiment, it is assumed that the thermoplastic resin tape 30 is supplied from both the tape supply devices 31 and 32 having a tension applying function, and a tape is continuously supplied from a roll of the thermoplastic resin tape 30. The tension applying function allows the tape supply devices 31 and 32 to adjust the tension applied to the thermoplastic resin tape 30. For example, during the operation by the grafting device 100, the tape supply devices 31 and 32 apply a tension (a winding tension) of 2.0 N or greater to the thermoplastic resin tape 30. In the present embodiment, the tension applying function is achieved by using a torque motor as a tension applying device, and tension applying devices 33A and 33B are driven in conjunction with the shaft of a roll around which the thermoplastic resin tape 30 is wound to apply a tension to the thermoplastic resin tape 30. However, this does not intend to suggest any limitation, and a tension may be applied by using a roll shaft incorporating the tension applying function and stopping the supply of the thermoplastic resin tape. When the tape supply direction is changed in the middle of the process because of the arrangement of the tape supply devices 31 and 32, a tape guiding member may be provided as necessary. For example, in the example of FIG. 4, a tape guiding member 37 is attached to a frame 135, and the supply direction of the thermoplastic resin tape 30 is changed through the tape guiding member 37.

Employed as the thermoplastic resin tape 30 is stretchy resin, and for example, resin having a tensile strength of 300 to 700 kg/cm$^2$ and a tensile elongation of 300 to 700%. The thermoplastic resin tape 30 has a thickness of, for example, 0.28 mm and a width in the Z-axis direction of, for example, 10 mm. The thickness and the width in the Z-axis direction of the tape can be appropriately selected depending on crops to be grafted. For example, the thermoplastic resin tape 30 may have a thickness of approximately 0.4 mm and a width in the Z-axis direction of approximately 12 mm. More specifically, as the thermoplastic resin tape 30, thermoplastic polyurethane elastomer, thermoplastic polyurethane, vinyl chloride, polyvinyl alcohol, polystyrene, polypropylene, or the like may be used. The use of any thermoplastic resin tape reduces the cost of the joint material to a half to one-seventh of that of an adhesive tape, a C-shaped tube, a clip, or the like.

The tape pull-out mechanism 39 is located anterior to the hold mechanisms 24 and 124 located in the outer periphery of the rotating table 20 in the rotational direction. The thermoplastic resin tape 30 supplied from the tape supply device 31 is guided by the pin 28 as a pull-out member to the transfer paths of the hold mechanisms 24 and 124. The thermoplastic resin tape 30 pulled out by the pin 28 forms a substantially U-shape around the pin 28. Since the hold mechanisms 24 and 124 holding the grafted seedling 103 transfer after the pin 28, when the hold mechanisms 24 and 124 reach the position of 6 o'clock, the grafted seedling 103 is sandwiched between the thermoplastic resin tapes 30. That is, the pin 28 serves a function as a sandwiching mechanism that pulls out the thermoplastic resin tape 30 from the tape supply unit 39, and sandwiches the grafted seedling 103 (the closely attached part of the cut surfaces of the graft 102 and the rootstock 104) by the thermoplastic resin tape.

The welding unit 43 includes the welding machine 40, a welding machine electrically-driven slider 42, and a pushing member 35. As illustrated in FIG. 4, the welding machine 40 is located near the position of 6 o'clock of the rotating table 20. The welding machine 40 is a device generating fine ultrasonic vibration, and is used to fasten the closely attached part of the cut surfaces of the graft 102 and the rootstock 104 held by the hold mechanisms 24 and 124 at the position of 6 o'clock with the thermoplastic resin tape 30. The welding machine 40 can reciprocate in the Y-axis direction by the welding machine electrically-driven slider 42. As illustrated in FIG. 6, the pushing member 35 located between the upper table 26A and the lower table 26B is positioned at the +Y side of the welding machine 40. Tangible functions and operations of the welding machine 40 will be described later. The welding machine electrically-driven slider 42 may not be necessarily electrically driven. The welding machine electrically-driven slider 42 may be driven by air pressure or manually driven instead of electrically driven, and the driving method may be appropriately selected by a worker. In the present embodiment, the pushing member 35 is attached to the frame 135 extending from the outside of the outer periphery of the rotating table 20, but the pushing member 35 may be directly provided to the upper table 26A or the lower table 26B.

Figure 8A:
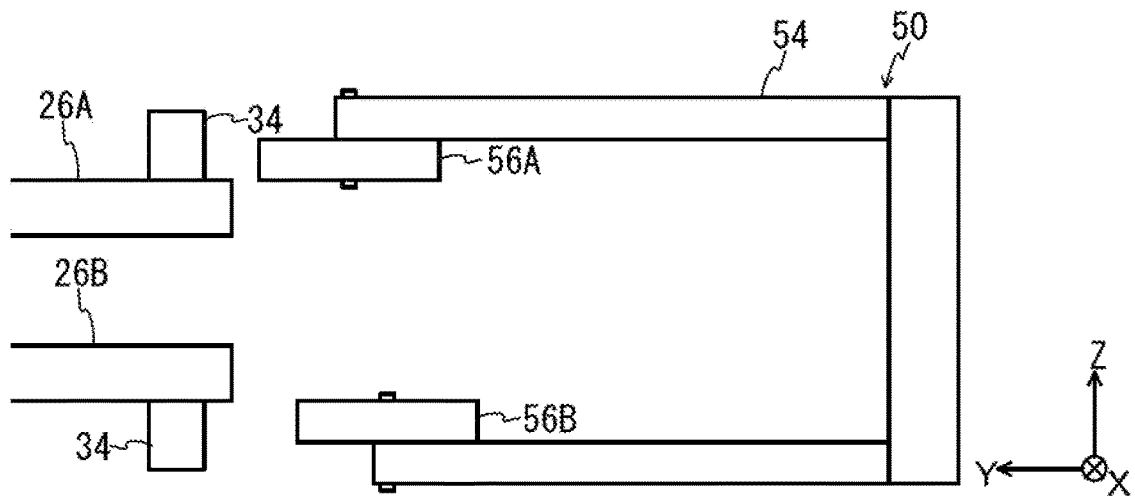
FIG. 8A through FIG. 8C are diagrams for describing a hold release unit.
Figure 8B:
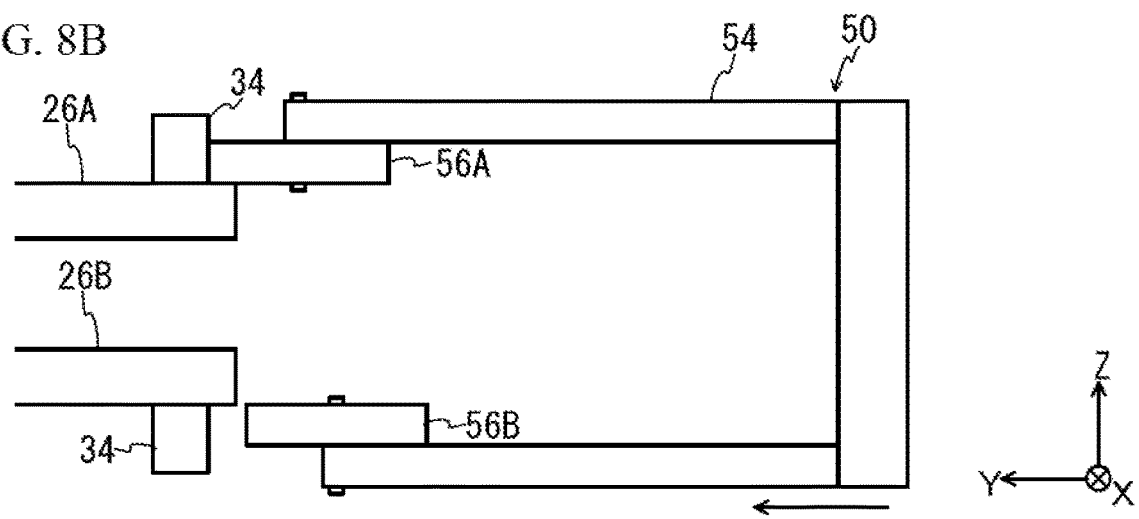
Figure 8C:
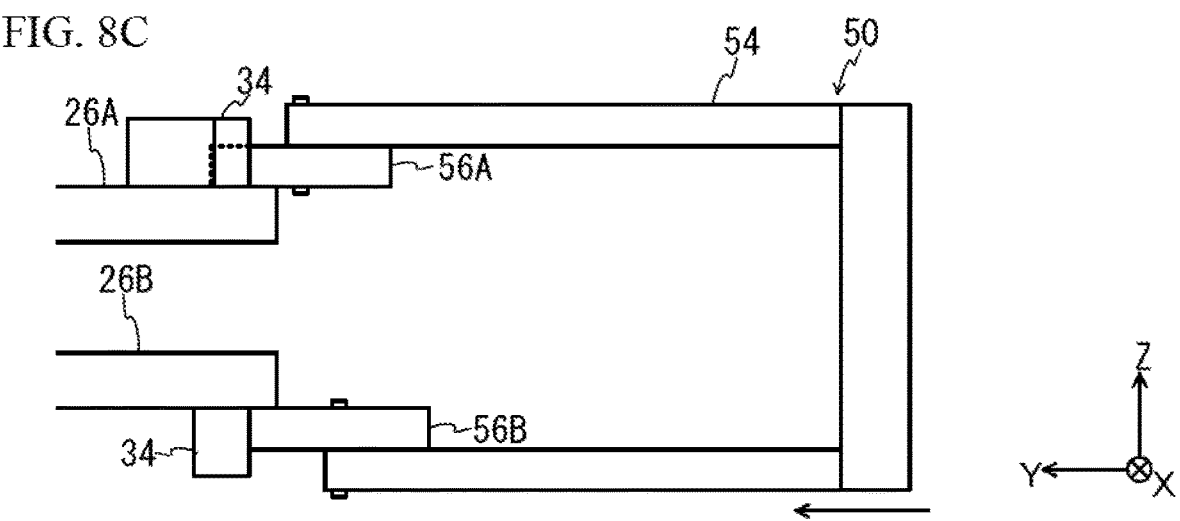

The hold release mechanism 51 includes a hold release unit 50 and a hold release electrically-driven slider 52. The hold release unit 50 can reciprocate in the Y-axis direction by the hold release electrically-driven slider 52 illustrated in FIG. 4. The hold release unit 50 presses contact portions 56A and 56B against the force applying portions 34 of the hold mechanisms 24 and 124 at the position of 7 o'clock from the −Y side to release a hold of the grafted seedling 103 by the hold mechanisms 24 and 124. Here, as illustrated in FIG. 8A, the hold release unit 50 includes a hold release member 54 having a substantially U-shaped YZ cross-section, and the contact portions 56A and 56B located in the +Y end of the hold release member 54. The contact portion 56A is located at more +Y side than the contact portion 56B. The move of the hold release unit 50 in the +Y direction causes the contact portion 56A to press the force applying portion 34 located on the upper table 26A as illustrated in FIG. 8B. As the hold release unit 50 further moves in the +Y direction, as illustrated in FIG. 8C, the contact portion 56B presses the force applying portion 34 located on the lower table 26B. The hold release electrically-driven slider 52 may not be necessarily electrically driven. The hold release electrically-driven slider 52 may be driven by air pressure or manually driven instead of electrically driven. The drive method may be appropriately selected by a worker. The timing when the contact portion 56A presses the force applying portion 34 at the upper table 26A side may be shifted from the timing when the contact portion 56B presses the force applying portion 34 at the lower table 26B side by making the positions in the Y-axis direction of the contact portions 56A and 56B the same and making the position of the force applying portion 34 located on the upper table 26A different from the position of the force applying portion 34 located on the lower table 26B (the position in the Y-axis direction in FIG. 8A through FIG. 8C). The positions in the Y-axis direction of the contact portions 56A and 56B may be made to differ from each other, and the positions in the Y-axis direction of the upper and lower force applying portions 34 may be made to differ from each other.

Referring back to FIG. 3, the conveyor 60 receives the grafted seedling 103 of which the hold by the hold mechanism 24 at the position of 7 o'clock has been released, and conveys it in the direction indicated by an arrow A in FIG. 3.

The control device 10 overall controls the operation of each unit of the grafting device 100 illustrated in FIG. 2. When detecting the operation of a start button or a stop button of an input unit 70 by a worker, the control device 10 controls the operation of each unit of the grafting device 100 according to the operation.

(Process by the Control Device 10)

Figure 9:
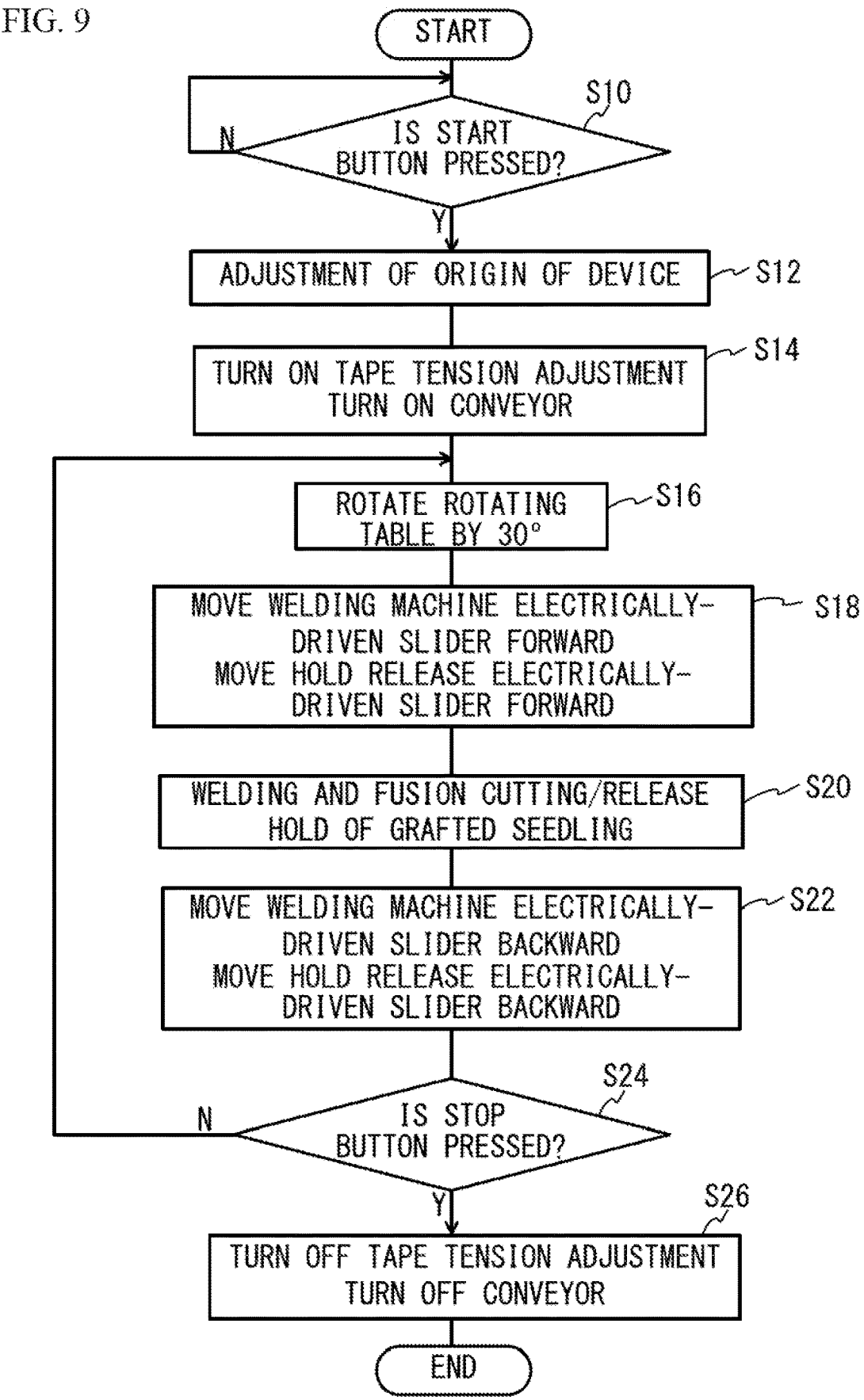
FIG. 9 is a flowchart illustrating a process executed by a control device.
Figure 10:
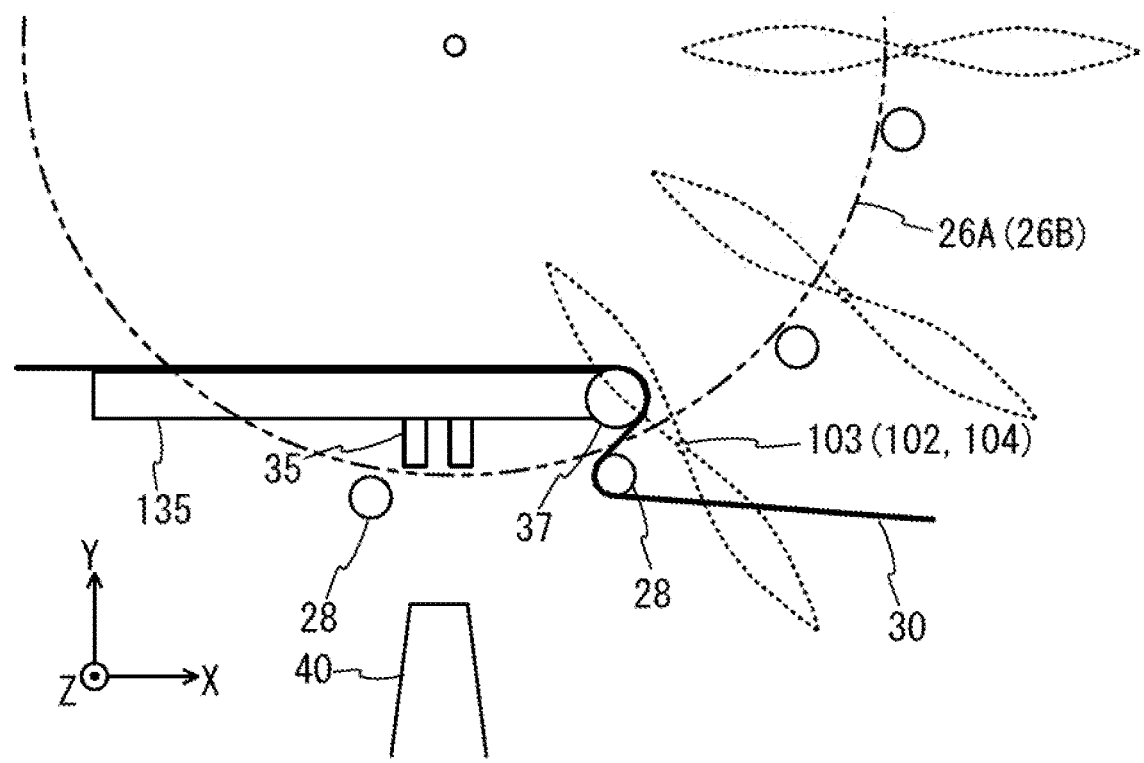
FIG. 10A and FIG. 10B are diagrams (No. 1) for describing the process illustrated in FIG. 9.
Figure 10:
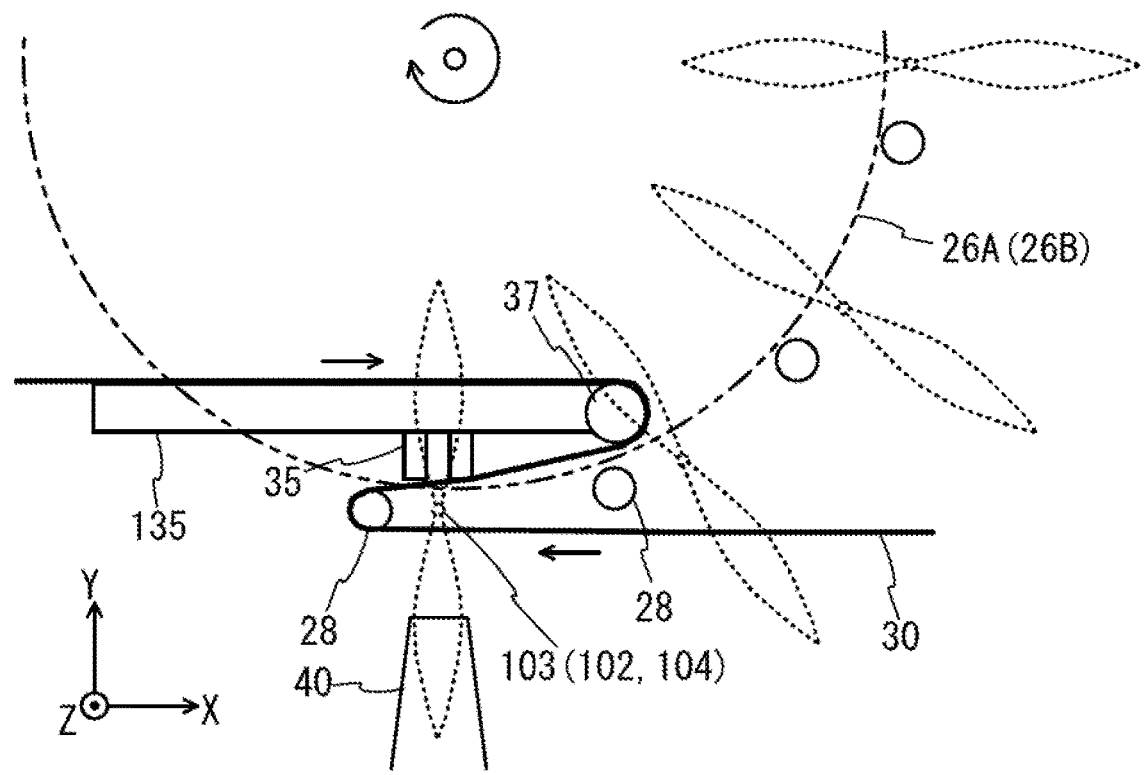

Next, a description will be given of processes by the control device 10 (the "(C) fastening of graft and rootstock" process and the "(D) ejecting of seedling" process) in the present embodiment along a flowchart presented in FIG. 9 with reference to other drawings as appropriately. As a prerequisite to the process of FIG. 9, it is assumed that when the process of FIG. 9 is started, the "(A) supplying of graft and rootstock" process is conducted at the position of 12 o'clock of the rotating table 20, and the "(B) cutting of graft and rootstock" process is conducted at the position of 3 o'clock of the rotating table 20. In the present embodiment, for the convenience sake, it is assumed that at the time when the process of FIG. 9 is started, the grafts 102 and the rootstocks 104 before cut are set in the position of 12 o'clock, the position of 1 o'clock, and the position of 2 o'clock, and the grafts 102 and the rootstocks 104 after cut are set in the position of 3 o'clock, the position of 4 o'clock, and the position of 5 o'clock. The grafts 102 and the rootstocks 104 after cut are in a state of grafted seedlings 103 in which their cut surfaces are closely attached.

In the process of FIG. 9, at step S10, the control device 10 waits until the start button is pressed.

When detecting the press of the start button of the input unit 70 by a worker, the control device 10 moves to step S12, and adjusts the origin of the device. That is, the control device 10 controls the rotating table drive device 22 to adjust the angle of the rotating table 20 so that the individual hold mechanisms 24 and 124 of the rotating table 20 are positioned at the prescribed positions. In addition, the control device 10 adjusts the positions of the welding machine electrically-driven slider 42 and the hold release electrically-driven slider 52 to initial positions (the −Y end).

Then, at step S14, the control device 10 turns on the tape tension adjustment of the tension applying devices 33A and 33B and turns on the conveyor 60. That is, the control device 10 controls the tension applying devices 33A and 33B operating in conjunction with the tape supply devices 31 and 32 to apply a tension of 2.0 N or greater to, for example, the thermoplastic resin tape 30. In addition, the control device 10 controls the conveyor 60 so that the upper surface of the conveyor 60 moves in the direction indicated by the arrow A in FIG. 3.

Then, at step S16, the control device 10 controls the rotating table drive device 22 to rotate the rotating table 20 by 30° in the clockwise direction.

Figure 11:
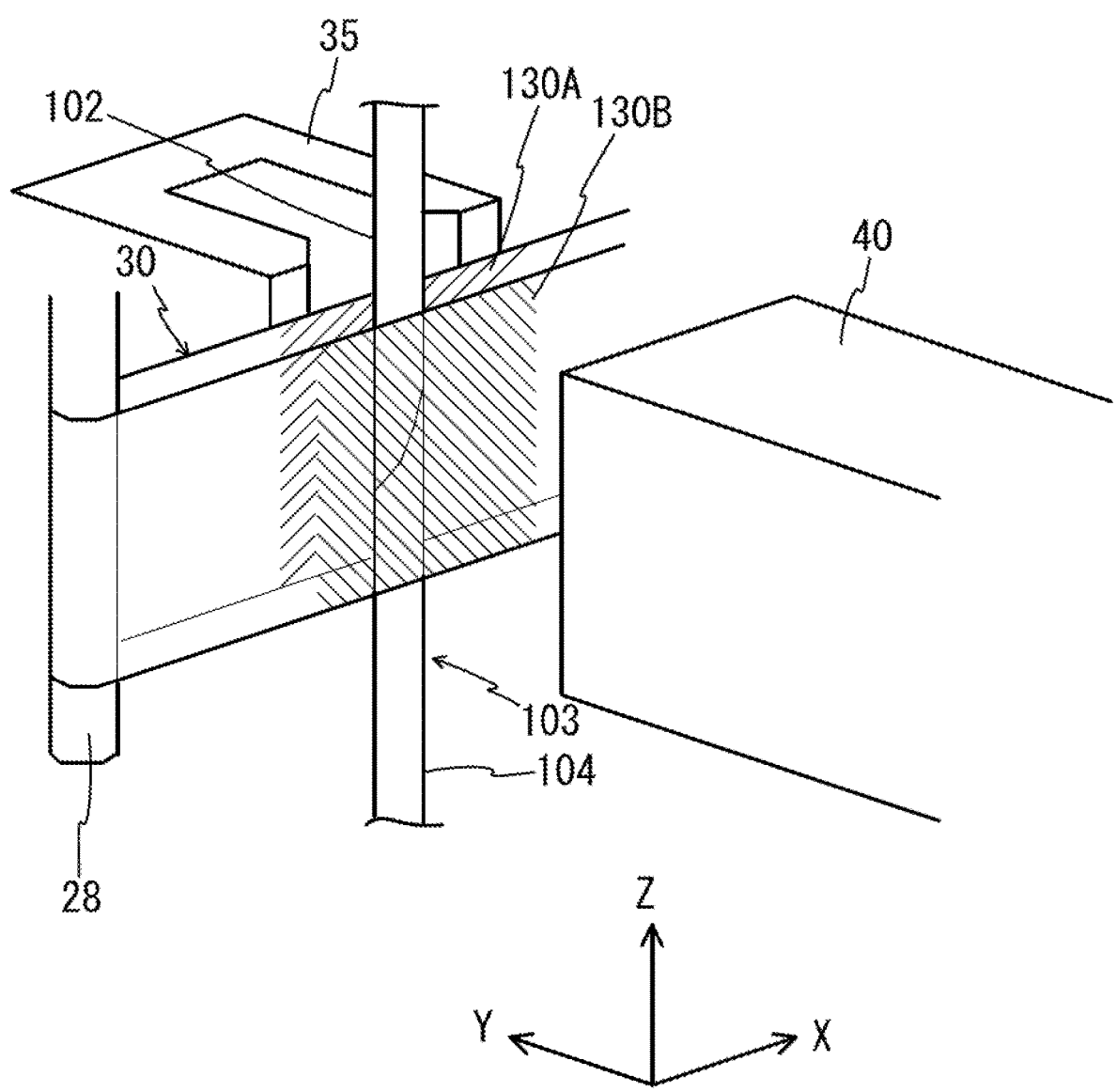
FIG. 11 is a perspective view illustrating the state of a thermoplastic resin tape illustrated in FIG. 10B.

The state before the process of step S16 is executed is schematically illustrated in FIG. 10A. In the state illustrated in FIG. 10A, the thermoplastic resin tape 30 is being caught by the pin 28 located anterior to the hold mechanisms 24 and 124 at the position of 5 o'clock in the clockwise direction. When the process of step S16 is executed, the state illustrated in FIG. 10B is established. In this case, as illustrated in FIG. 10B, as the rotating table 20 rotates by 30°, the grafted seedling 103 held by the hold mechanisms 24 and 124 transfers in the clockwise direction, and the pin 28 also transfers and pulls out the thermoplastic resin tape 30. In the state of FIG. 10B, as illustrated in FIG. 11, the closely attached part of the grafted seedling 103 is sandwiched by the thermoplastic resin tape 30 from both sides in the Y-axis direction. The part located at the +Y side of the grafted seedling 103 in FIG. 11 of the thermoplastic resin tape 30 will be referred to as a "first part 130A", and the part facing the first part 130A of the thermoplastic resin tape 30 will be referred to as a "second part 130B".

Figure 12A:
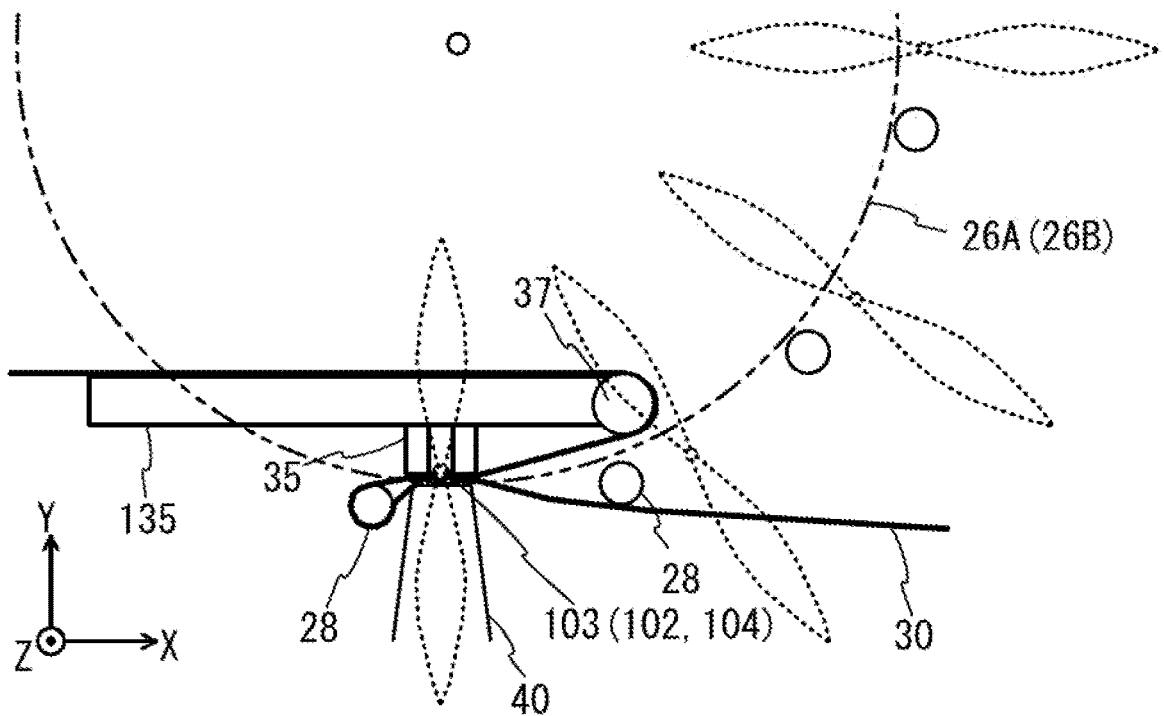
FIG. 12A and FIG. 12B are diagrams (No. 2) for describing the process illustrated in FIG. 9.
Figure 13:
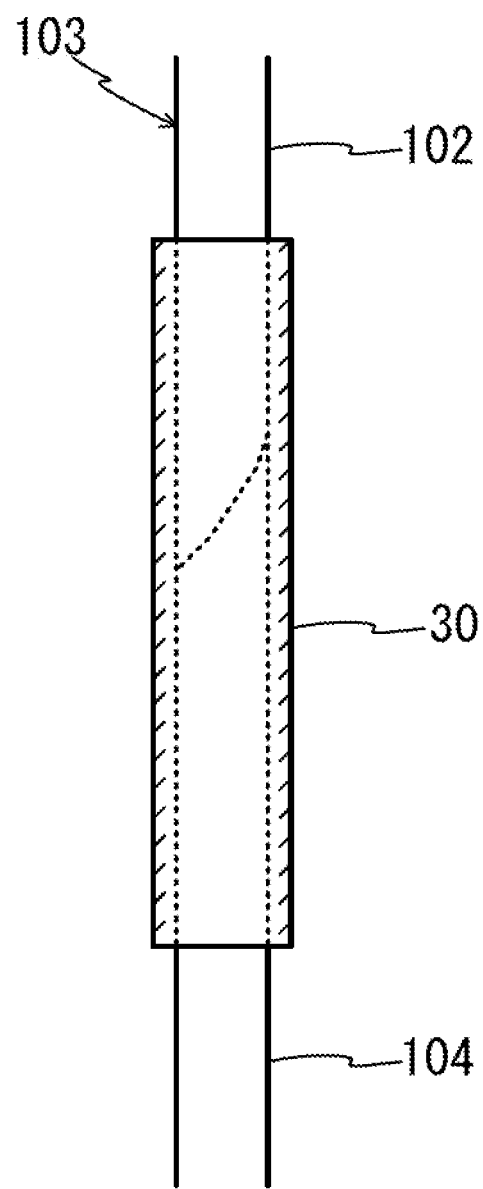
FIG. 13 is a diagram illustrating the vicinity of the joined faces of a graft and a rootstock after grafting.

Then, at step S18, the control device 10 moves the welding machine electrically-driven slider 42 forward (in the +Y direction) and moves the hold release electrically-driven slider 52 forward (in the +Y direction). Such a transfer of the welding machine electrically-driven slider 42 causes the welding machine 40 and the pushing member 35 to become closer to each other as illustrated in FIG. 12A. The pushing member 35 has two teeth as with a Geta as illustrated in FIG. 12A. Thus, the closely attached part of the grafted seedling 103 comes inside the space of the pushing member 35. Then, the part sandwiched between the welding machine 40 and the pushing member 35 (the first part 130A and the second part 130B) of the thermoplastic resin tape 30 is applied with fine ultrasonic vibration and pressure. This process instantly melts the thermoplastic resin tape 30 by frictional force generated between the thermoplastic resin tapes 30 (the first part 130A and the second part 130B), thereby welding the thermoplastic resin tape 30 and fusion cutting the thermoplastic resin tape 30 at a part of the welded part (step S20). The state of welding and fusion cutting of the thermoplastic resin tape 30 can be changed by changing the angle and shape of the −Y end of the pushing member 35 and the ultrasonic exposure time. Since the thermoplastic resin tape 30 is welded and fusion cut while being applied with a tensile load, the thermoplastic resin tape 30 shrinks when being fusion cut. The shrinkage causes the thermoplastic resin tape 30 to be closely attached to the closely attached part of the grafted seedling 103, thereby allowing the state where the graft 102 and the rootstock 104 (the state where the cut surfaces are closely attached to each other) are closely attached to be maintained as illustrated in FIG. 13. At this time, the thermoplastic resin tape 30 at the tape supply unit side of the welded and fusion cut thermoplastic resin tape 30 is welded and remains connected. As described previously, the hold release unit 50 also moves in the +Y direction, but the "(D) ejecting of seedling" process is not conducted because a seedling is not present at the position of 7 o'clock when the first grafted seedling 103 is fastened by the thermoplastic resin tape 30.

Figure 12B:
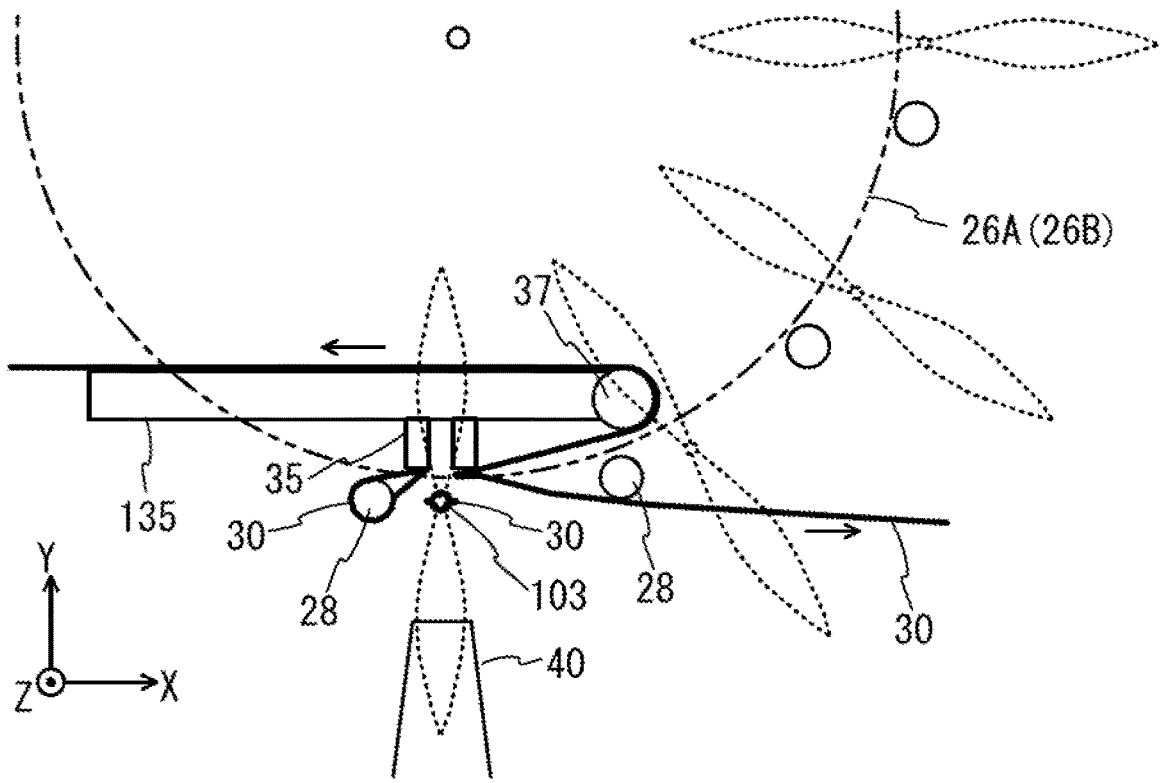
Figure 14A:
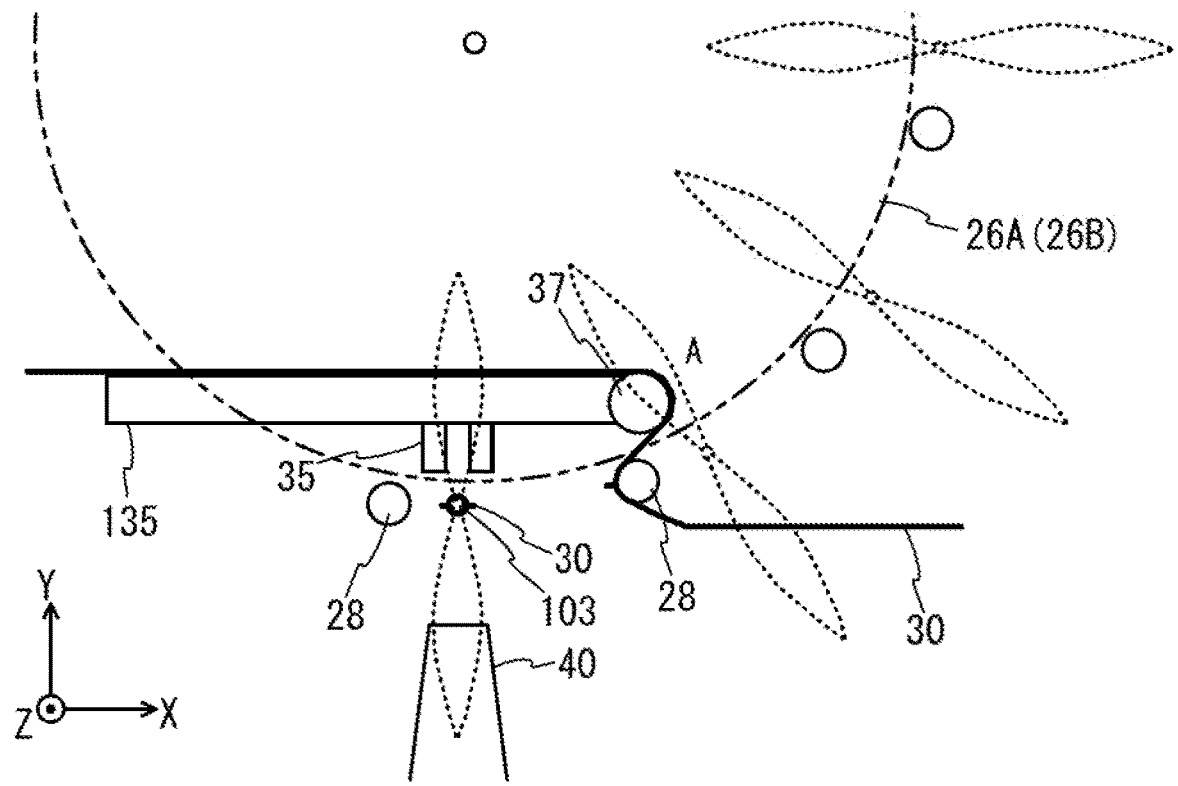
FIG. 14A and FIG. 14B are diagrams (No. 3) for describing the process illustrated in FIG. 9.

Then, at step S22, the control device 10 moves the welding machine electrically-driven slider 42 backward (in the −Y direction) and moves the hold release electrically-driven slider 52 backward (in the −Y direction). FIG. 12B illustrates the state where the welding machine 40 has moved in the −Y direction as the welding machine electrically-driven slider 42 has been moved backward (in the −Y direction). The thermoplastic resin tape 30 remaining around the pin 28 in FIG. 12B naturally falls thereafter. Since the tape supply devices 31 and 32 apply a tension (a winding tension) to the thermoplastic resin tape 30 by the tension applying devices 33A and 33B, the thermoplastic resin tape 30 that has been welded and fusion cut and remains connected moves (is wound) in the arrow direction in FIG. 12B, and becomes in the state of FIG. 14A. In the state of FIG. 14A, the thermoplastic resin tape 30 is caught by the pin 28 located anterior to the hold mechanisms 24 and 124 at the position of 5 o'clock in the clockwise direction.

Figure 14B:
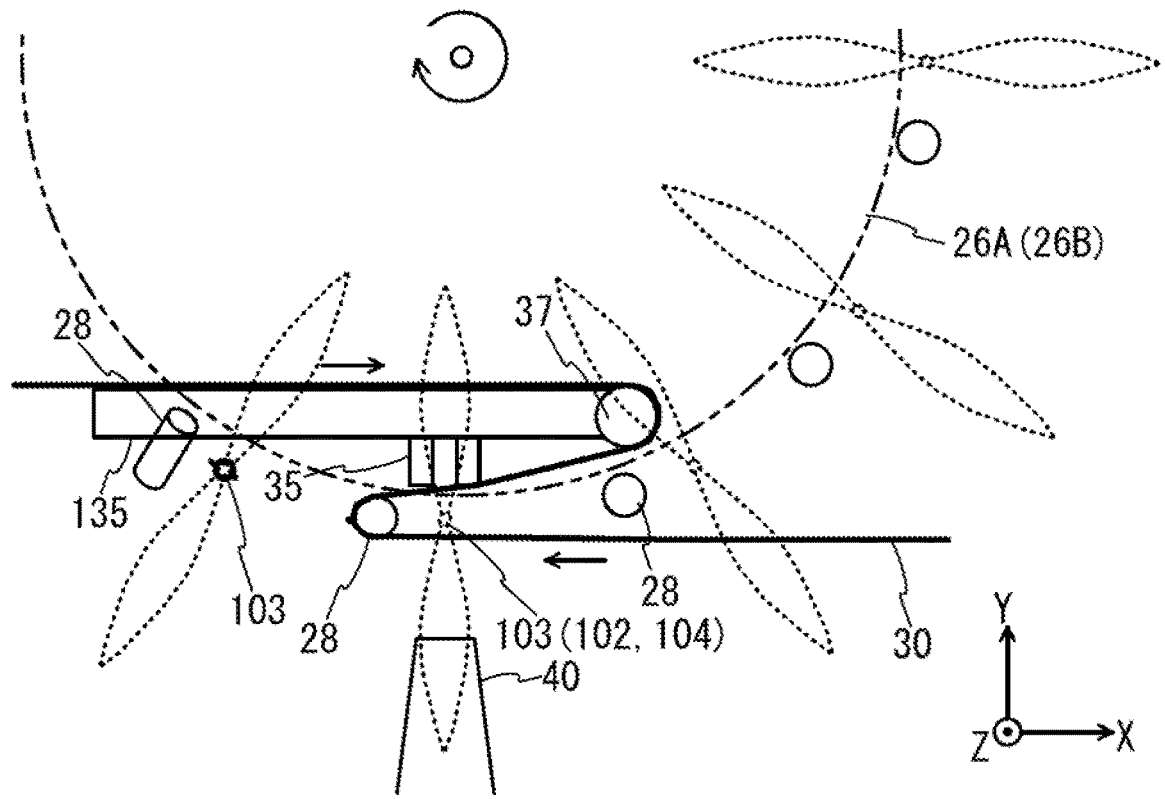

Then, at step S24, the control device 10 determines whether the stop button is pressed. When the determination at step S24 is NO, the process returns to step S16. Then, at step S16, the control device 10 rotates the rotating table 20 by 30° through the rotating table drive device 22, and the state illustrated in FIG. 14B is established. Then, at step S18, the control device 10 moves the welding machine electrically-driven slider 42 forward (in the +Y direction) and moves the hold release electrically-driven slider 52 forward (in the +Y direction). This causes the welding machine 40 to be pressed against the pushing member 35. Thus, at step S20, the thermoplastic resin tape 30 is welded and fusion cut, and the grafted seedling 103 is fastened. Step S18 causes the contact portions 56A and 56B of the hold release unit 50 to be pressed against the force applying portion 34 of the hold mechanism 24 (at the position of 7 o'clock) as illustrated in FIG. 8A through FIG. 8C. This process releases a hold of the grafted seedling 103 by the hold mechanisms 24 and 124 at the position of 7 o'clock after fastened. In the present embodiment, as illustrated in FIG. 8A through FIG. 8C, since the timing when the contact portion 56A presses the force applying portion 34 is made to differ from the timing when the contact portion 56B presses the force applying portion 34, a hold of the seedling by the hold mechanisms 24 and 124 is released while the graft 102 and the rootstock 104 are reliably fastened. That is, there may be a case that only the rootstock 104 falls when a hold of the rootstock 104 is released in first, but by releasing a hold of the graft 102 in first as described above, the possibility of only the rootstock 104 falling is reliably reduced. As a result of step S18, the seedling after grafting falls onto the conveyor 60, and is then conveyed by the conveyor 60 in the direction indicated by the arrow A in FIG. 3.

Thereafter, the processes and the determinations at steps S16 through S24 are repeated till the determination at step S24 becomes YES (until the stop button is pressed). This process allows the grafting operation to be continuously automatically performed.

When the determination at step S24 becomes YES, the process moves to step S26, and the control device 10 turns off the tape tension adjustment by the tension applying devices 33A and 33B of the tape supply devices 31 and 32 and turns off the operation of the conveyor 60. The entire process of FIG. 9 ends as described above.

Here, the tape pull-out mechanism 39 has a displacing function that temporarily displaces the pin 28 from the transfer paths of the hold mechanisms 24 and 124. Since the pin 28 is swingably mounted to the rocking shaft 127 of the fixed member 27, when the frame 135 or the like is on the transfer path, the pin 28 can avoid the frame 135 by swinging in the circumferential direction of the rotating table 20. As illustrated in FIG. 14B, to rotate the rotating table 20, at around the position of 7 o'clock, the pin 28 needs to cross over the frame 135 holding the pushing member 35 and the thermoplastic resin tape 30 supplied from the tape supply device 31 toward the welding unit. Thus, in the present embodiment, as illustrated in FIG. 4 and FIG. 7, a cover member 198 is provided so as to cover the region above the frame 135 and the thermoplastic resin tape 30 supplied from the tape supply device 31.

The cover member 198 is composed of a planar section covering the upper surface of the frame 135 and the thermoplastic resin tape 30 supplied from the tape supply device 31 from above, and a substantially triangle slant face 98 that is inclined at a predetermined pitch from the frame 135 in the −Y direction and the width thereof narrows in the −X direction. Furthermore, the +X side end of the slant face 98 is located between the upper table 26A and the lower table 26B, and the −X side end protrudes from the rotating table 20 in the lateral direction. Thus, when the pin 28 rotates around the rotating shaft 120 as the rotating table 20 rotates, the side surface of the shaft part of the pin 28 comes in contact with the lower end of the slant face 98. As the pin 28 further rotates, the position of the side surface of the shaft part of the pin 28 being in contact with the lower end of the slant face 98 moves toward the tip, and finally, the tip part of the pin 28 runs on the slant face 98, and is guided onto the planar section of the cover member 198. The shape of the cover member 198, which is provided to allow the pin 28 to cross over the frame 135 to which the pushing member 35 is attached and the thermoplastic resin tape 30 supplied from the tape supply device 31 toward the welding unit, is not limited to the shape illustrated in FIG. 4 and FIG. 7, and may be other shapes as long as the pin 28 is guided. For example, the cover member 198 may not necessarily have the slant face 98.

The above description has described a case where the grafts 102 and the rootstocks 104 are set in the position of 12 o'clock and the positions of 1 to 5 o'clock when a worker presses the start button, but does not intend to suggest any limitation. For example, the start button may be pressed in a state where the graft 102 and the rootstock 104 are not set. In this case, until the graft 102 and the rootstock 104 reach the position of 6 o'clock, only the welding and fusion cutting of the thermoplastic resin tape 30 are conducted at the position of 6 o'clock.

As described in detail above, in the present embodiment, the rotating table 20 transfers the grafted seedling 103, which is in a state where the cut surface of the graft 102 and the cut surface of the rootstock 104 are closely attached to each other, in a predetermined direction (a clockwise direction), and the tape supply devices 31 and 32 arrange the thermoplastic resin tape 30 on the transfer path of the grafted seedling 103 in such a manner that the thermoplastic resin tape 30 is allowed to be pulled out. Additionally, the pin 28 transfers through the transfer path in advance of the grafted seedling 103, thereby pulling out the thermoplastic resin tape 30 from the tape supply devices 31 and 32, and sandwiches the closely attached part of the grafted seedling 103 with the thermoplastic resin tape 30. The welding machine 40 welds the thermoplastic resin tape 30 (the first part 130A and the second part 130B) to cover the periphery of the closely attached part of the grafted seedling 103 with the thermoplastic resin tape 30. As described above, since the pin 28 moves in advance of the grafted seedling 103 and pulls out the thermoplastic resin tape 30, the grafted seedling 103 does not need to directly pull out the thermoplastic resin tape 30. Accordingly, the occurrence of the shift of the positions of the joined surfaces of the graft 102 and the rootstock 104 at the time of grafting is reduced, the load on the grafted seedling 103 is reduced, and the grafted seedling is allowed to be reliably fastened. Therefore, the efficiency of grafting (the yield ratio) improves. Additionally, the present embodiment allows the automation of grafting with a simple structure when grafting is carried out by ultrasonically welding a tape. In particular, the present embodiment allows automation of a grafting operation with good efficiency with a simple structure in fastening of a grafted seedling by ultrasonically welding a tape using a low cost joint material.

Additionally, the present embodiment allows the joined state of the grafted seedling 103 to be maintained in an appropriate state by fastening a grafted plant with use of the thermoplastic resin tape 30 by ultrasonic welding. More specifically, since the ultrasonic welding uses friction heat, fastening of the grafted seedling can be conducted with less affected by the temperature condition of the surroundings and trichome or water near the grafted seedling 103 compared to the case where a tape using adhesive agents as a joint material is used. Additionally, the ultrasonic welding does not need a large amount of heat for shrinking plastic unlike a case where heat-shrinkable plastic is used as a joint material. Thus, there is no thermal effect on the grafted seedling 103, and the time required for welding can be shortened (for example, one second or less). Additionally, in ultrasonic welding, even during the control under high humidity after grafting, unlike a tape using adhesive agents, a tape is not easily peeled due to the humidity, and the joined state is stably maintained. Additionally, when a tube is used as a joint material, it is necessary to prepare several tubes having diameters appropriate to the diameters (shaft diameters) of grafts and rootstocks, and select appropriate one. However, in the present embodiment, the use of the thermoplastic resin tape 30 enables to handle grafts and rootstocks with various diameters. In addition, since the thermoplastic resin tape 30 is light in weight, compared to a case where a clip is used as a joint material, the effect of the weight of the joint material on the grafted seedling 103 is reduced. Furthermore, unlike a case where stretch nonwoven cloth having ventilation characteristics and water retention characteristics is used as a joint material, by covering the closely attached part of the grafted seedling 103 by the thermoplastic resin tape 30, the occurrence of a case where a root grows from the graft and a grafted plant does not take root is prevented. In addition, the cost of the joint material is less than that of a clip that has been conventionally used in a grafting device. Thus, the price of a grafted seedling by a grafting device is reduced.

Additionally, in the present embodiment, the welding machine 40 can cut (fusion cut) a welded part of the thermoplastic resin tape 30 at the same time as welding, and thus, it is not necessary to separately provide a device for cutting the thermoplastic resin tape 30. Additionally, by fusion cutting the thermoplastic resin tape 30 at the same time as welding, the time required for a grafting operation is reduced. However, the welding machine 40 may not necessarily cut the thermoplastic resin tape 30. In this case, for example, at the position of 7 o'clock, the thermoplastic resin tape 30 may be cut by a certain cutting mechanism. More specifically, the thermoplastic resin tape 30 may be cut by heat with use of a soldering iron or ultrasonic wave, or the thermoplastic resin tape 30 may be cut by shear force with use of a nipper or scissors. Alternatively, the thermoplastic resin tape 30 may be cut at the same time as welding by attaching a cutting blade to the tip of the welding machine 40. In any cases, the thermoplastic resin tape 30 at the tape supply unit side after cut remains connected by welding.

Additionally, in the present embodiment, a predetermined tension is applied to the thermoplastic resin tape 30. Thus, by welding and fusion cutting the thermoplastic resin tape 30 by the welding machine 40, the shrinkage of the thermoplastic resin tape 30 causes the thermoplastic resin tape 30 to be closely attached to the grafted seedling 103, and the shift between the graft and the rootstock after grafting is reduced. When a graft or a rootstock is slightly warp, or when the diameter of a graft differs from the diameter of a rootstock, this configuration is especially effective.

Additionally, in the present embodiment, the rotating table 20 fixes the hold mechanism 24, which holds the graft 102, on the upper table 26A, fixes the hold mechanism 124, which holds the rootstock 104, on the lower table 26B, and rotates as a whole. Thus, a simple operation, which is the rotation of the rotating table 20, allows the grafted seedling 103 to transfer along the outer periphery of the rotating table 20. In addition, since the graft 102 and the rootstock 104 of which the cut surfaces are closely attached are made to rotate together along the outer periphery of the rotating table 20 to transfer to the welding unit, and then the thermoplastic resin tape is welded so as to cover the periphery of the grafted seedling 103. Therefore, a grafting operation is efficiently conducted.

Additionally, in the present embodiment, since the pin 28 is provided anterior to the hold mechanism 24 arranged in the outer peripheral portion of the rotating table 20 in the rotational direction, the pin 28 can be transferred in advance of the grafted seedling 103 without providing a special mechanism for driving the pin.

Additionally, the present embodiment provides a displacing mechanism (a mechanism including the cover member 198 and a structure supporting the pin 28 by the rocking shaft 127 of the fixed member 27) temporarily displaces the pin 28 from the transfer path of the grafted seedling 103 (see FIG. 7). This configuration prevents the pin 28 from coming in contact with the frame 135 or the thermoplastic resin tape 30 and thereby interrupting the rotation of the rotating table 20. Additionally, in the present embodiment, the pin 28 is swingably mounted to the rocking shaft 127 extending in the tangential direction of the outer periphery of the upper table 26A, and the cover member 198 has the slant face 98 that guides the pin 28 so that the pin 28 is lifted at a predetermined position by the rotation of the rotating table 20. This configuration allows the pin 28 to be displaced with a simple structure without driving the pin 28 by a motor or the like.

Additionally, in the present embodiment, the rotating table 20 holds the grafted seedling 103 in the outer peripheral portion and rotates around the rotating shaft 120, and the tape supply unit arranges the thermoplastic resin tape 30 on the transfer path of the grafted seedling 103 in such a manner that the thermoplastic resin tape 30 can be pulled out. The pin 28 pulls out the thermoplastic resin tape 30 from the tape supply devices 31 and 32 as the rotating table 20 rotates, and the closely attached part of the grafted seedling 103 is sandwiched by the thermoplastic resin tape 30. Furthermore, the welding machine 40 ultrasonically welds the thermoplastic resin tape 30 to cover the periphery of the closely attached part of the grafted seedling 103 with the thermoplastic resin tape 30. The rotation of the rotating table 20 and the ultrasonic welding by the welding machine 40 allow the grafted seedling 103 to be fastened by the thermoplastic resin tape 30 in a short time without thermally affecting the grafted seedling 103. Additionally, compared to fastening with heat-shrinkable plastic, fastening with less energy than the energy used to shrink plastic becomes possible.

Additionally, in the present embodiment, since the thermoplastic resin tape 30 is transparent, a worker can visually recognize through the thermoplastic resin tape 30 whether the graft 102 and the rootstock 104 are appropriately closely attached.

The above embodiment has described a case where the hold mechanisms 24 and 124 are arranged at intervals of 30°, but does not intend to suggest any limitation, and the hold mechanisms 24 and 124 may be arranged at intervals of other angles. In this case, at step S16 in FIG. 9, it is sufficient if the rotating table 20 rotates by the interval (angle) at which the hold mechanisms 24 and 124 are arranged.

The structures of the hold mechanisms 24 and 124 and the hold release unit 50 of the above embodiment are merely examples. For example, the hold operation and the hold release operation of the hold mechanisms 24 and 124 may be implemented by control of a motor or the like.

The above embodiment has described a case where the pin 28 is guided by the slant face 98 of the cover member 198 and swings (is lifted), but does not intend to suggest any limitation. For example, the pin 28 may be swung by a driving mechanism such as a motor, or the pin 28 may be slid in the horizontal direction (in the Z-axis direction) by a driving mechanism.

Figure 15:
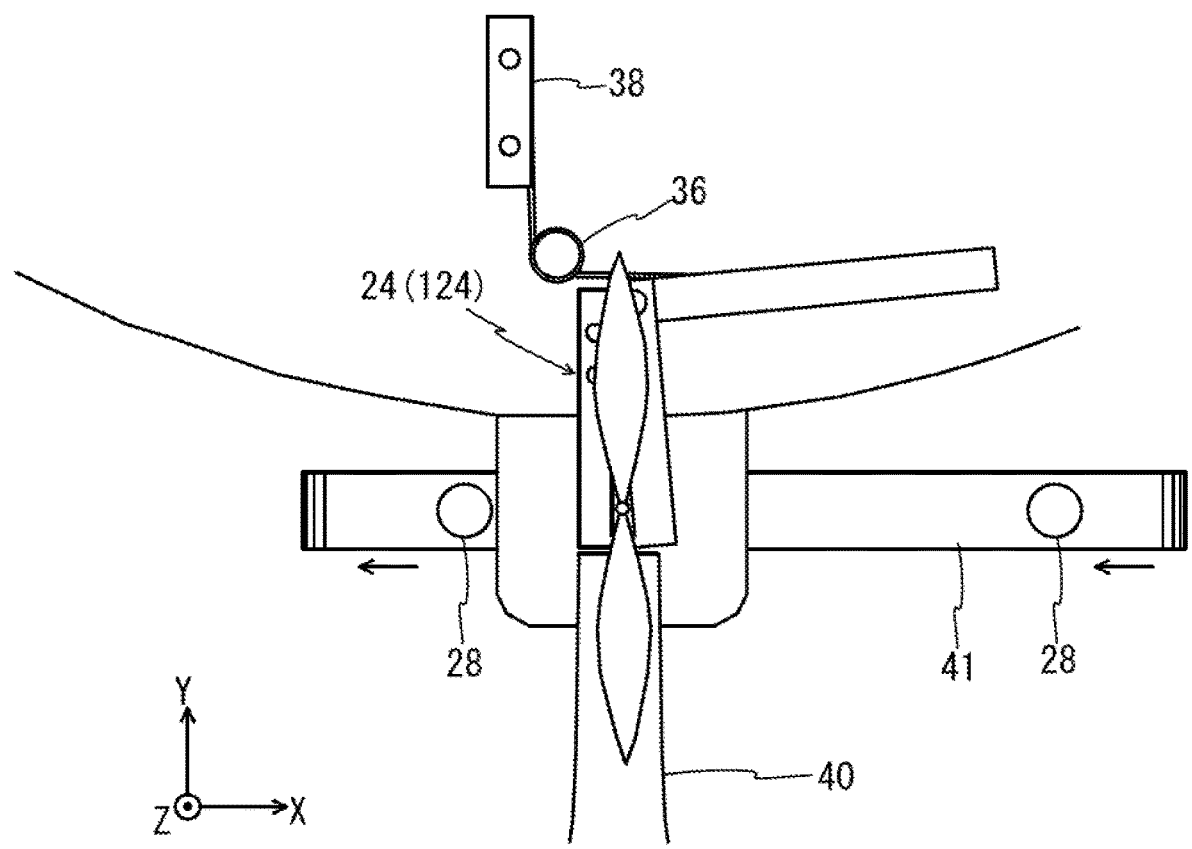
FIG. 15 is a diagram illustrating a variation in which a pin is moved by a conveyor belt.

The above embodiment has described a case where the pin 28 is provided on the upper table 26A, but does not intend to suggest any limitation. For example, the pin 28 may be located on the lower table 26B. Alternatively, as illustrated in FIG. 15, the tape pull-out mechanism may be composed of the pins 28 and a conveyor belt 41, and a plurality of the pins 28 fixed to the conveyor belt 41 may be moved in the X-axis direction. In this case, the conveyor belt 41 is driven so that the pin 28 move in the −X direction in advance of the hold mechanisms 24 and 124 while the hold mechanisms 24 and 124 move from the position of 5 o'clock to the position of 6 o'clock. This configuration allows the thermoplastic resin tape 30 to be pulled out from the tape supply devices 31 and 32 by the pin 28 as in the above embodiment.

Figure 16A:
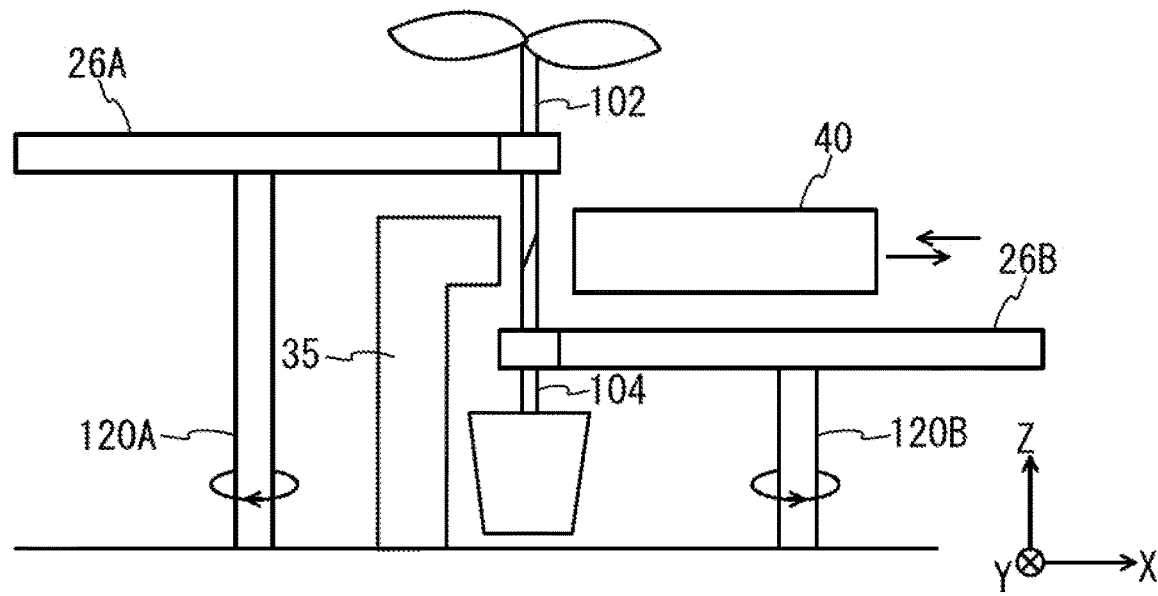
FIG. 16A and FIG. 16B are diagrams for describing another variation in which an upper table and a lower table are provided to separate rotating shafts.
Figure 16B:
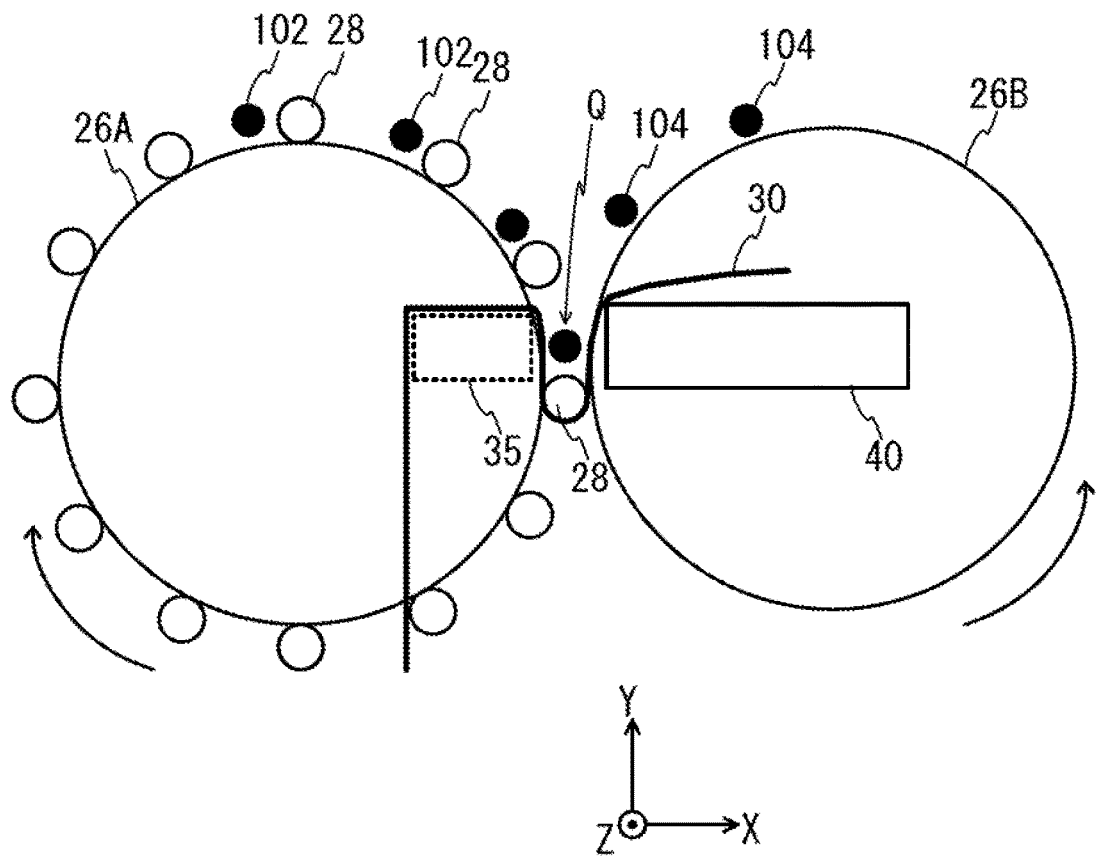

The above embodiment has described a case where the upper table 26A and the lower table 26B are provided to the same rotating shaft 120, but does not intend to suggest any limitation. For example, as illustrated in FIG. 16A and FIG. 16B, the upper table 26A and the lower table 26B may be respectively provided to different rotating shafts 120A and 120B. In this case, by rotating the upper table 26A and the lower table 26B in opposite directions (directions indicated by arrows in FIG. 16B), at the position Q of FIG. 16B, the state similar to the state at the position of 6 o'clock in the above embodiment (the state where the grafted seedling 103 is sandwiched by the thermoplastic resin tape 30) is achieved. Therefore, by pressing the welding machine 40 against the pushing member 35 at the position Q, the grafting operation can be performed as in the above embodiment.

The above embodiment has described a case where both the tape supply devices 31 and 32 supply the thermoplastic resin tape 30, but does not intend to suggest any limitation. For example, the thermoplastic resin tape 30 may be supplied from a single tape supply device, and the end of the thermoplastic resin tape 30 may be fixed, and the tape supply device may have a tension applying device inversely rotatable.

Figure 17A:
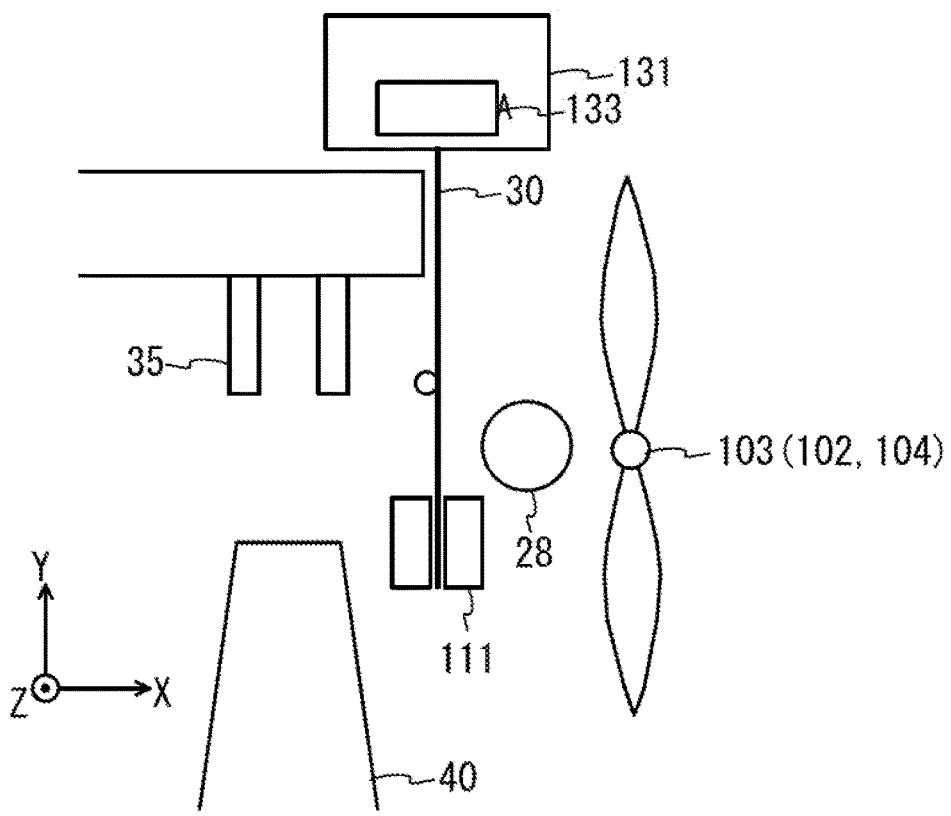
FIG. 17A and FIG. 17B are diagrams (No. 1) for describing a variation in which only one tape supply device is used.
Figure 17B:
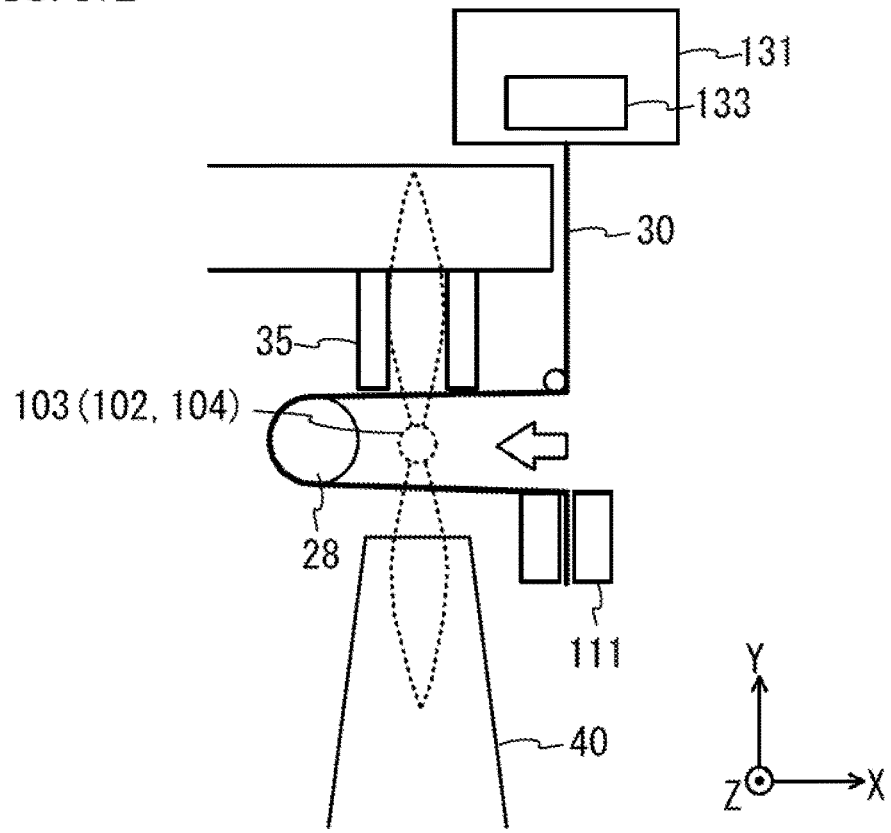
Figure 18A:
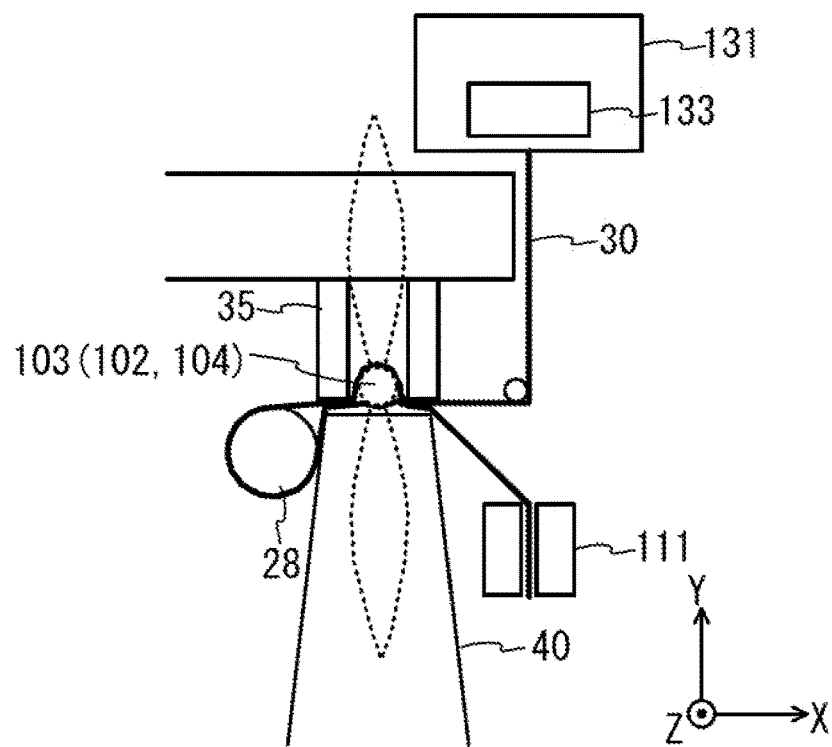
FIG. 18A and FIG. 18B are diagrams (No. 2) for describing the variation in which only one tape supply device is used.
Figure 18B:
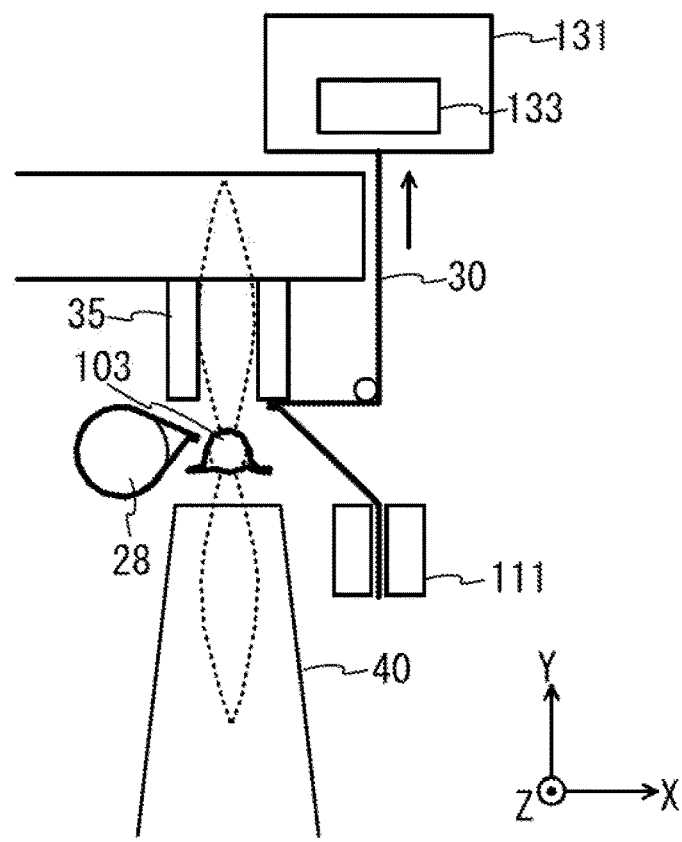

Alternatively, for example, as illustrated in FIG. 17A, the thermoplastic resin tape 30 may be arranged on the transfer paths of the pin 28 and the grafted seedling 103 by holding a first end of the thermoplastic resin tape 30 supplied from a tape supply device 131 by a chuck mechanism 111. In this case, as the pin 28 and the grafted seedling 103 transfer as illustrated in FIG. 17B, the same state as the state illustrated in FIG. 10B in the above embodiment is achieved. Then, after the thermoplastic resin tape 30 is welded and fusion cut by the welding machine 40 as illustrated in FIG. 18A, a tension applying device 133 of the tape supply device 131 pulls the thermoplastic resin tape 30 in the +Y direction as illustrated in FIG. 18B. This process arranges the thermoplastic resin tape 30 on the transfer paths of the pin 28, the graft 102, and the rootstock 104 again. Such a configuration achieves the same advantage as the above embodiment.

After welding and fusion cutting, the fusion-cut thermoplastic resin tape 30 at the tape supply device 131 side and the thermoplastic resin tape 30 held by the chuck mechanism 111 remain connected.

The above embodiment provides the hold mechanisms 24 and 124 holding the graft 102 and the rootstock 104 in the outer periphery of the rotating table 20 as a transfer unit, and transfers the graft 102 and the rootstock 104 by the rotation of the rotating table 20, but does not intend to suggest any limitation. For example, a pair of hold devices may be used to hold the graft 102 and the rootstock 104 and transfer the grafted seedling 103, which is in a state where the cut surfaces of the graft 102 and the rootstock 104 are closely attached to each other, from the +X direction to the −X direction in FIG. 17A, and thereafter, a thermoplastic resin tape may be pulled out from the tape supply unit without applying a load to the grafted seedling 103 by the pin 28 of the tape pull-out mechanism 39 and may be ultrasonically welded in the welding unit.

Figure 19A:
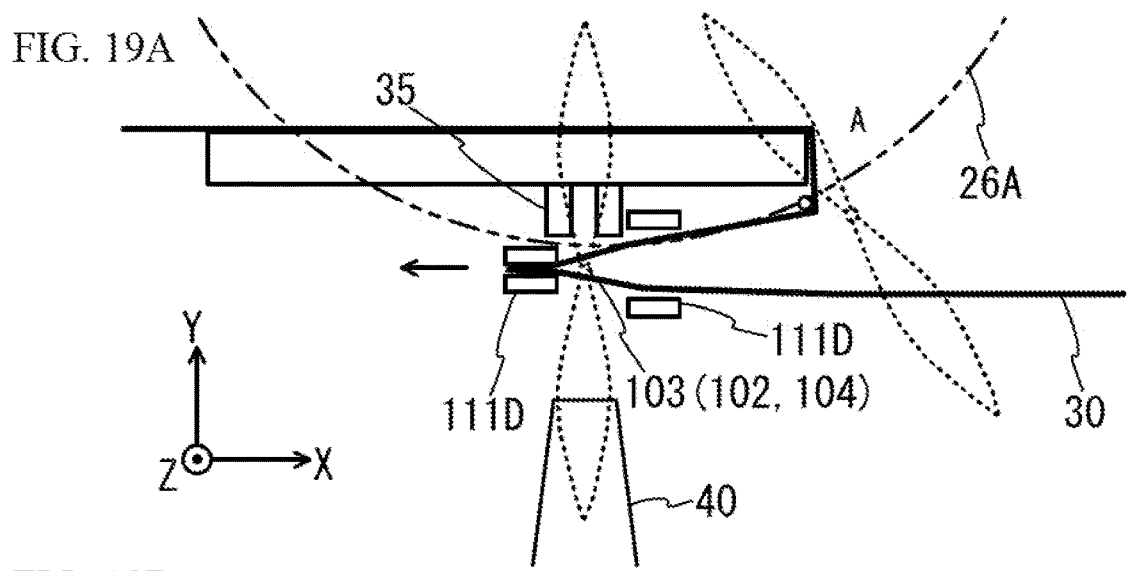
FIG. 19A through FIG. 19C are diagrams for describing a variation in which a thermoplastic resin tape is pulled by a chuck mechanism.
Figure 19B:
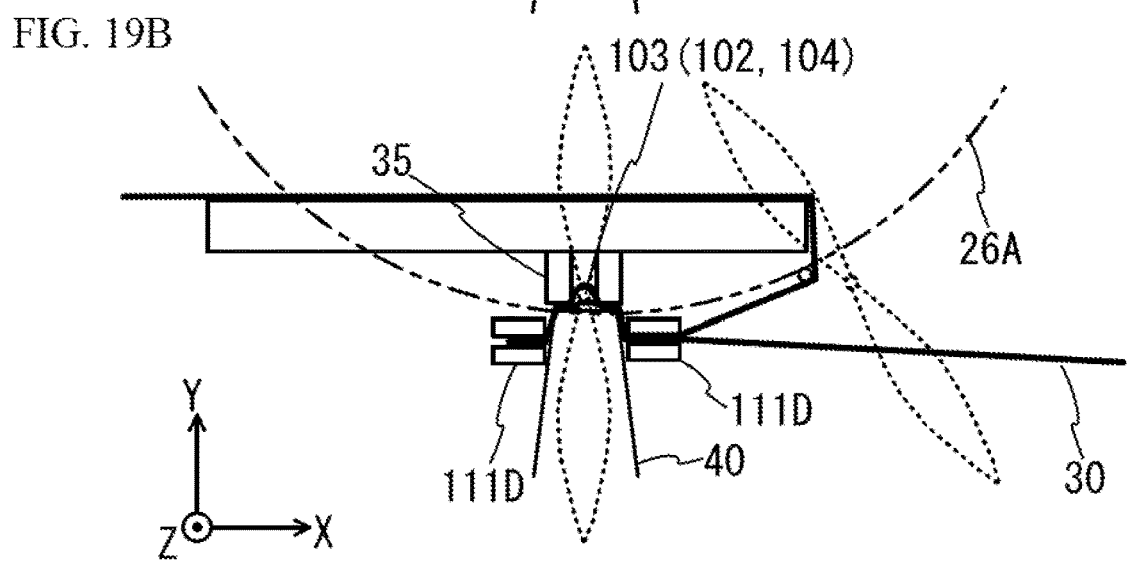
Figure 19C:
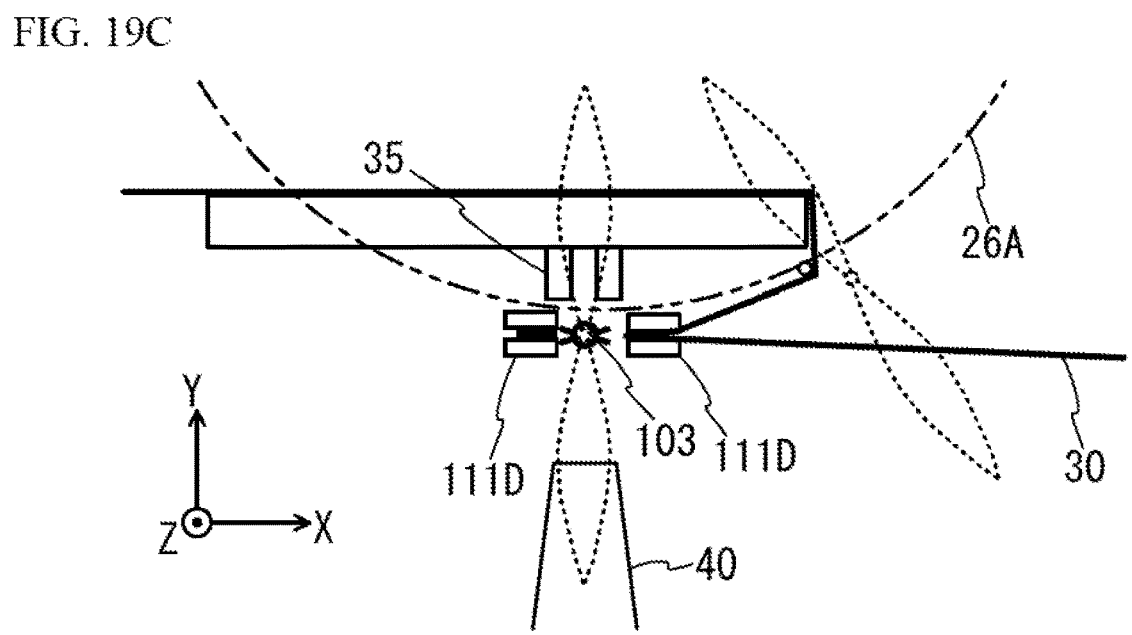

The above embodiment has described a case where the thermoplastic resin tape 30 is pulled out from the tape supply devices 31 and 32 by the pin 28, but does not intend to suggest any limitation. For example, as illustrated in FIG. 19A, a chuck mechanism 111D holding a part of the thermoplastic resin tape 30 may transfer in advance of the grafted seedling 103. In this case, in the above embodiment, the pull-out member (the pin 28) of the tape pull-out mechanism located on the rotating table 20 is replaced by the chuck mechanism 111D that sandwiches the thermoplastic resin tape and rotates in accordance with the rotation of the rotating table 20 while being located anterior to the hold mechanism in the rotational direction. As illustrated in FIG. 19B and FIG. 19C, immediately before welding and fusion cutting are conducted by the welding machine 40 after the grafted seedling 103 reaches the position of 6 o'clock, the chuck mechanism 111D located posterior to the grafted seedling that has been closely attached sandwiches the thermoplastic resin tapes 30 supplied from the tape supply devices 31 and 32 together, and the thermoplastic resin tapes 30 are welded and fusion cut. Thereafter, as the rotating table 20 rotates, the chuck mechanism 111D located posterior to the fastened grafted seedling pulls out a tape, and the next grafted seedling is sandwiched between the thermoplastic resin tapes 30. The repetition of this operation enables automatic fastening of a grafted seedling. The chuck mechanism 111D may mechanically hold (sandwich) the thermoplastic resin tape 30, or hold the thermoplastic resin tape 30 by vacuum contact. Alternatively, the chuck mechanism 111D may static-electrically or magnetically hold the thermoplastic resin tape 30. In this case, it is sufficient if the thermoplastic resin tape 30 is charged or a magnetic substance is attached to the thermoplastic resin tape 30. In this case, the chuck mechanism 111D corresponds to the sandwiching mechanism.

In the example of FIG. 19A, the welding machine 40 may not necessarily perform fusion cutting. For example, after the chuck mechanism 111D pulls out the thermoplastic resin tape 30, the part between the grafted seedling 103 located at the position of 7 o'clock and the chuck mechanisms 111D before and after the grafted seedling 103 may be cut. In this case, it is sufficient if a cutting mechanism such as an electric nipper or an air nipper may be provided.

The above embodiment has described a case where the grafted seedling 103 is prevented from being damaged by pulling the thermoplastic resin tape 30 from the tape supply devices 31 and 32 with use of the pin 28, but does not intend to suggest any limitation. For example, when the graft 102 and the rootstock 104 are trees, since the stem is hard, the damage is less even when the thermoplastic resin tape 30 is pulled out with use of the graft 102 and the rootstock 104. In this case, the grafted seedling 103 of trees held by the hold mechanisms 24 and 124 pulls out the thermoplastic resin tape supplied from the tape supply unit as the rotating table 20 rotates, and moves to the position of 6 o'clock. Then, the grafted seedling 103 can be fastened by fusion cutting and welding the rear side in the rotational direction of the grafted seedling 103 covered by the thermoplastic resin tape 30 in a U-shape by the welding unit. Therefore, in this case, the pin 28 may be omitted.

The above embodiment has described a case where the control device 10 sequentially controls the operation of each device, but does not intend to suggest any limitation. For example, sensors may be provided at necessary points of the grafting device 100, and the operation of each device may be controlled based on the detection results of the sensors.

The above embodiment has described a case where the thermoplastic resin tape 30 is transparent, but does not intend to suggest any limitation, and the thermoplastic resin tape 30 may be opaque or semi-transparent.

Figure 20A:
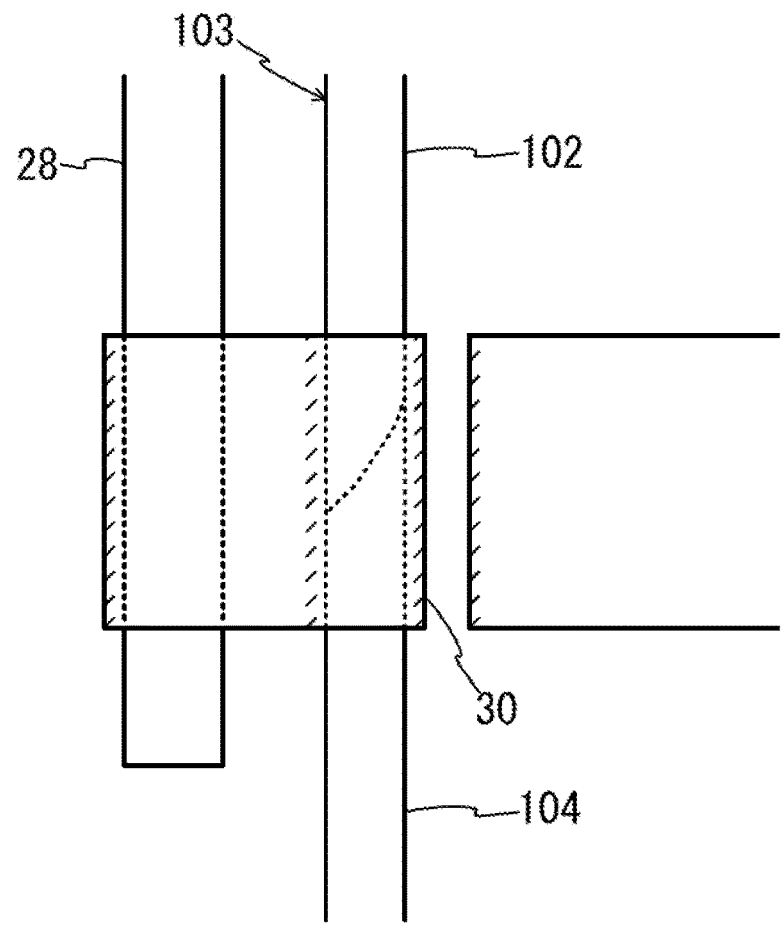
FIG. 20A and FIG. 20B are diagrams for describing an example in which a part between a pin and a grafted seedling of the thermoplastic resin tape is not cut.
Figure 20B:
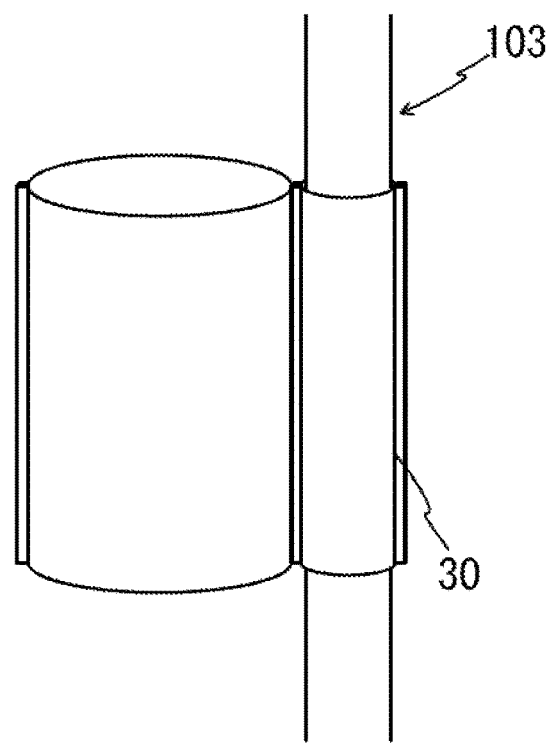

In the above embodiment, the protrusion amounts of the right part and the left part (a first side and a second side in the X-axis direction in FIG. 6) of the tip portion of the welding machine 40 may differ from each other, and/or the protrusion amounts of the right part and the left part (a first side and a second side in the X-axis direction) of the pushing member 35 may differ from each other. The above configuration allows the part at which the contact force (pressing force) between the welding machine 40 and the pushing member 35 is weak to be welded, and the part at which the contact force is strong to be welded and fusion cut. Therefore, when the pressing force of a welded part between the pin 28 and the grafted seedling 103 (the −X side of the grafted seedling) is made to be weak, and the pressing force of the other part is made to be strong, as illustrated in FIG. 20A, the thermoplastic resin tape 30 around the pin 28 remains while being connected to the thermoplastic resin tape 30 covering the grafted seedling 103. In this case, as illustrated in FIG. 20B, the thermoplastic resin tape (a ring-shaped part) around the pin 28 remains connected to the thermoplastic resin tape covering the grafted seedling 103 after the ejection in the seedling ejection unit 112. Thus, a grafted tree can be supported by a support pole by inserting the support pole to the ring-shaped part. Additionally, the thermoplastic resin tape 30 covering the periphery of the pin 28 is prevented from falling out from the pin 28 and scattering near the seedling joining unit 110.

(First Variation)

Figure 21:
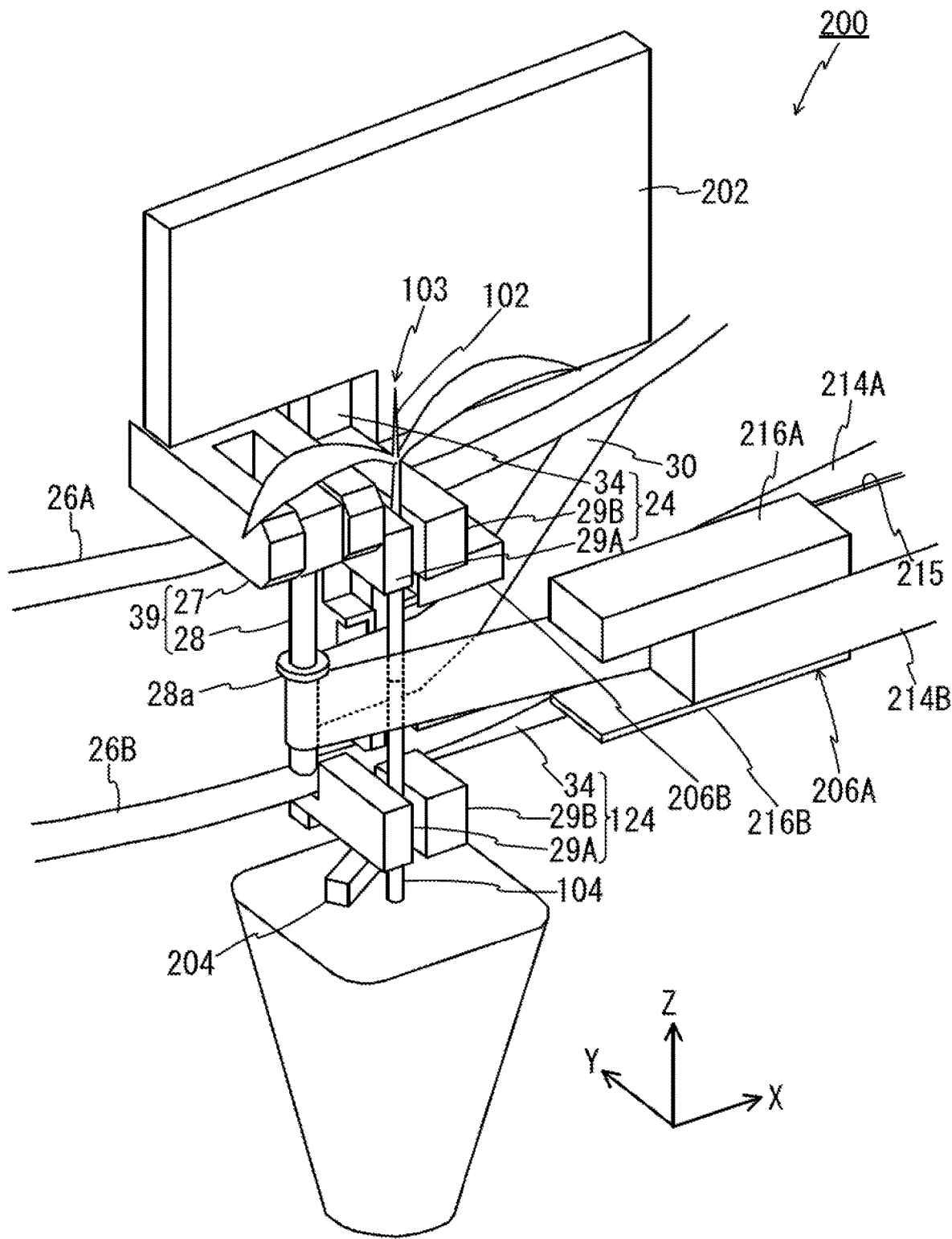
FIG. 21 is a perspective view illustrating a part of a grafting device in accordance with a first variation.
Figure 22:
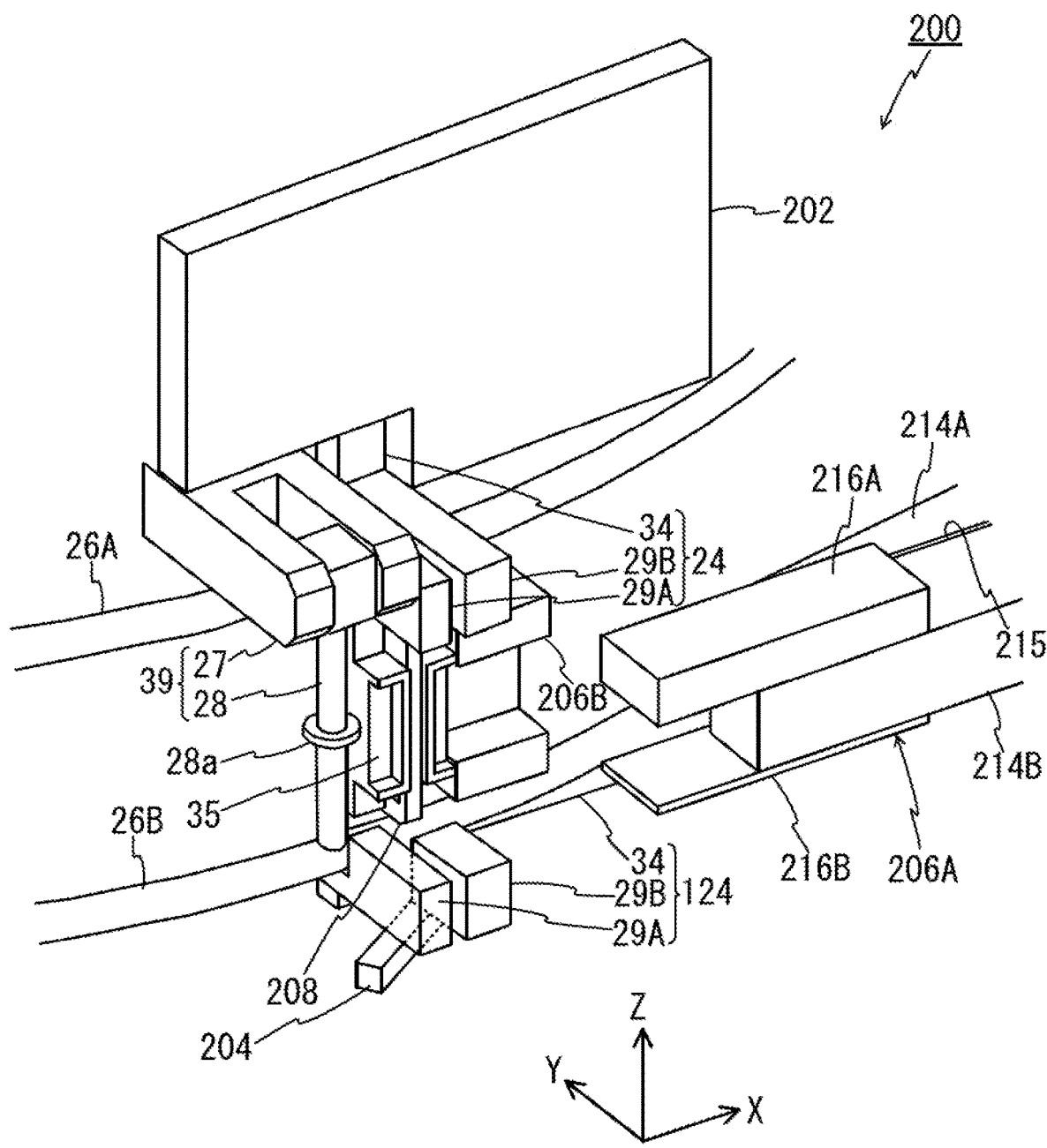
FIG. 22 is a perspective view illustrating a state in which the thermoplastic resin tape and the grafted seedling are omitted from FIG. 21.

FIG. 21 is a perspective view of a part of a grafting device 200 in accordance with a first variation. FIG. 22 is a perspective view in which the thermoplastic resin tape 30 and the grafted seedling 103 (the graft 102, the rootstock 104) are omitted from FIG. 21.

As illustrated in FIG. 21 and FIG. 22, in the first variation, an annular member 28a as a restriction unit is provided at a predetermined height position of the pin 28. The predetermined height position in this case may be a position substantially being in contact with the upper end of the thermoplastic resin tape 30 in a state where the pin 28 substantially horizontally pulls out the thermoplastic resin tape 30. Guide members 206A and 206B as restriction units are provided near the pushing member 35.

The guide member 206A is provided to a support post (not illustrated) located at the +X side and the −Y side of the pushing member 35, and includes Y direction guide members 214A and 214B and Z direction guide members 216A and 216B. The Z direction guide members 216A and 216B are fixed to the Y direction guide member 214B provided to the support post with a screw. However, this does not intend to suggest any limitation, and the Z direction guide members 216A and 216B may be fixed to the Y direction guide member 214A, or may be fixed to both the Y direction guide members 214A and 214B. Alternatively, one of the Z direction guide members may be fixed to one of the Y direction guide members, and the other of the Z direction guide members may be fixed to the other of the Y direction guide members. The fixing method may be a fixing method other than a fixing method using a screw. The Y direction guide members 214A and 214B are arranged at a predetermined interval in the Y-axis direction, and form a gap 215. The thermoplastic resin tape 30 is guided between the Z direction guide members 216A and 216B by making the thermoplastic resin tape 30 pass through the gap 215. Since the Z direction guide members 216A and 216B are located at an interval approximately identical to the width of the thermoplastic resin tape 30, the Z direction guide members 216A and 216B restrict the move in the Z direction (the vertical direction) of the thermoplastic resin tape 30 guided by the Y direction guide members 214A and 214B. In the present embodiment, the Z direction guide members 216A and 216B are located at more −X side (the position closer to the pin 28) than the Y direction guide members 214A and 214B. This structure makes the positions of the Z direction guide members 216A and 216B set to the positions close to the path of the pin 28. Thus, the vertical position of the thermoplastic resin tape 30 when the pin 28 pulls out the thermoplastic resin tape 30 is stabilized.

The guide member 206B is located adjacent to the pushing member 35 at the +X side. The guide member 206B has a U-shape in which the upper end and the lower end protrude to the −Y side, and the thermoplastic resin tape 30 is sandwiched from top and bottom in the part protruding to the −Y side, and the move in the Z direction (the vertical direction) of the thermoplastic resin tape 30 is restricted.

The annular member 28a and the guide members 206A and 206B restrict the direction in which the thermoplastic resin tape 30 pulled out by the pin 28 is pulled out. Thus, the shift of the thermoplastic resin tape 30 in the vertical direction is reduced, and the appropriate position of the graft 102 and the rootstock 104 is covered with the thermoplastic resin tape 30. That is, the upper end and the lower end of the thermoplastic resin tape 30 can be guided by the annular member 28a and the guide members 206A and 206B so that the thermoplastic resin tape 30 sandwiches and covers the closely attached part of the grafted seedling 103 with substantially uniform widths in the vertical direction. Therefore, the shift of the graft 102 and the rootstock 104 after grafting can be effectively inhibited. Since the annular member 28a is located above the thermoplastic resin tape 30 as illustrated in FIG. 21, the annular member 28a never prevents the thermoplastic resin tape 30 remaining around the pin 28 from naturally falling. The annular member 28a may not be necessarily provided to the pin 28, and for example, the diameter of the pin 28 at the lower side may be made to be less than the diameter of the pin 28 at the center part, and the diameter of the pin 28 at the upper side may be made to be larger.

Here, it is not illustrated in FIG. 21, but the gap 215 between the Y direction guide members 214A and 214B may be configured to be opened and closed by an actuator. In this case, the Y direction guide members 214A and 214B may be driven in the opposite directions in the Y-axis direction, or one of them may be driven in the Y-axis direction. However, to stably supply the thermoplastic resin tape 30, the Y direction guide member 214B is preferably driven. When the gap 215 is configured to be opened and closed, it is sufficient if the Z direction guide member 216A is fixed to one of the Y direction guide members 214A and 214B, and the Z direction guide member 216B is also fixed to one of the Y direction guide members 214A and 214B. The control device 10 controls the actuator to make the gap 215 wide during the rotation of the rotating table 20 and to make the gap 215 narrow at the same time as the stop of the rotating table 20 so that the thermoplastic resin tape 30 is held between the Y direction guide members 214A and 214B. This configuration allows the thermoplastic resin tape 30 to be pulled out by the pin 28 while being applied with a predetermined tension during the rotation of the rotating table 20, and allows the tension of the thermoplastic resin tape 30 to be maintained when the rotating table 20 is stopped. Therefore, when ultrasonic welding by the welding machine 40 is conducted, and the grafted seedling 103 is pushed into the space of the pushing member 35 while the rotating table 20 is being stopped, a tension necessary to maintain the joined state of the grafted seedling 103 is reliably applied to the thermoplastic resin tape 30. The slipping when the thermoplastic resin tape 30 is held is reduced by providing an elastic member such as a sponge or rubber on the face where the Y direction guide members 214A and 214B face each other.

The vertical position (the Z direction position) of the guide member 206A with respect to the support post may be configured to be adjustable. By adjusting the vertical position of the guide member 206A, the vertical position of the thermoplastic resin tape 30 located at the −Y side of the grafted seedling 103 and the vertical position of the thermoplastic resin tape 30 located at the +Y side can be aligned.

In the first variation, as illustrated in FIG. 22, a spring member 208 as a biasing member is located in the space (the part into which the closely attached part of the grafted seedling 103 is inserted) of the pushing member 35. The spring member 208 is a substantially L-shaped metal member. In the first variation, as in the above embodiment, the thermoplastic resin tape 30 is sandwiched by the pushing member 35 and the welding machine 40 and welded and fusion cut while the graft 102 and the rootstock 104 are located in the space of the pushing member 35. In this case, the fastened grafted seedling 103 is located in the space of the pushing member 35. However, as in the first variation, by providing the spring member 208, the elastomeric force of the spring member 208 biases the grafted seedling 103 after fastened in a direction away from the pushing member 35. This structure prevents the rotating table 20 from rotating in a state where the grafted seedling 103 after fastened remains in the space of the pushing member 35, and prevents excessive force from being applied to the grafted seedling 103.

Figure 23:
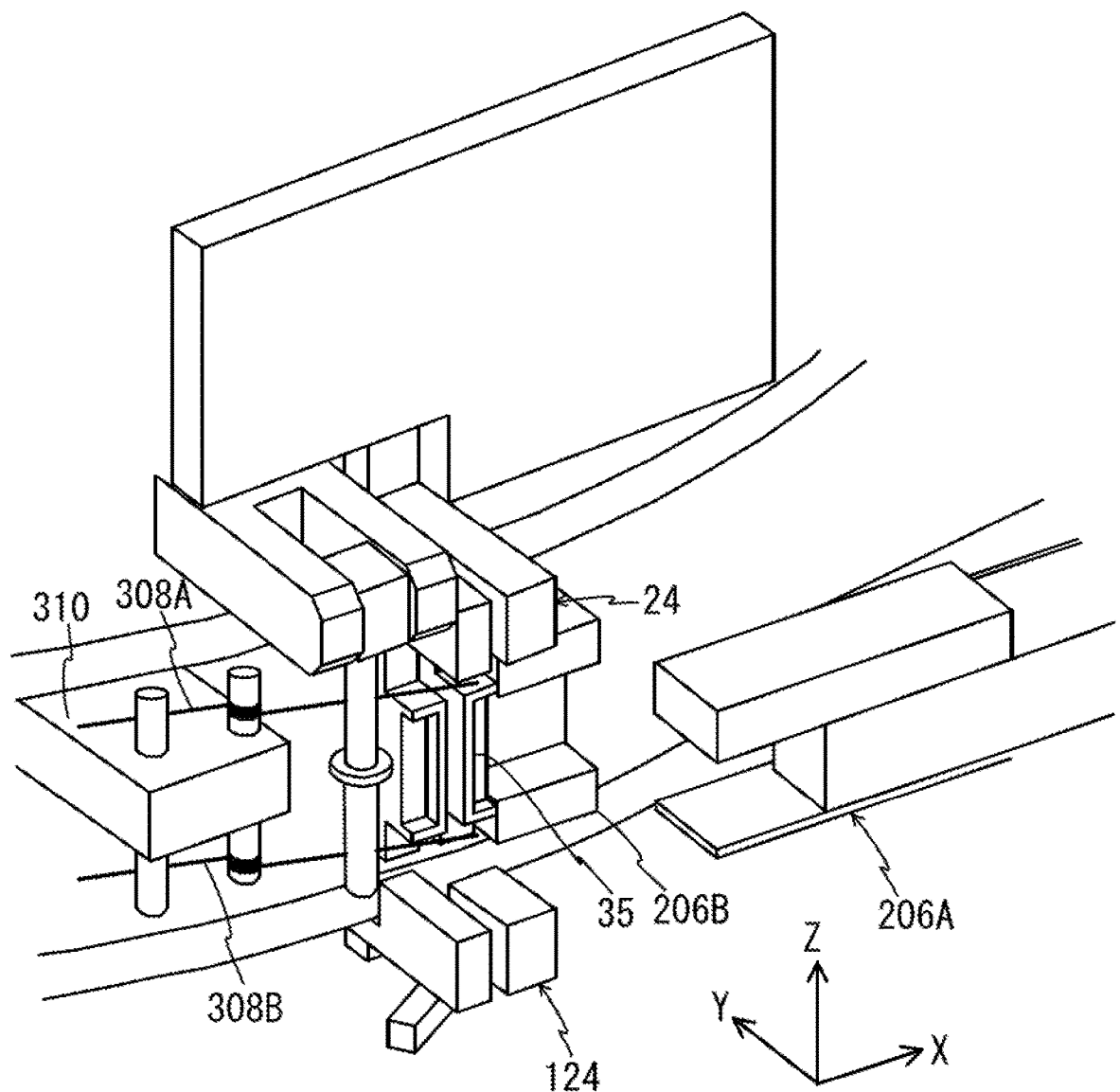
FIG. 23 illustrates an example in which a torsion spring is used as a biasing member.

In FIG. 22, a case where the spring member 208 is provided in the space of the pushing member 35 has been described, but this does not intend to suggest any limitation. For example, as illustrated in FIG. 23, as a biasing member, torsion springs 308A and 308B may be provided near the top and the bottom of the pushing member 35. The torsion springs 308A and 308B are provided to a holding member 310 that is fixed to the frame 135 (see FIG. 4) as with the pushing member 35. The torsion springs 308A and 308B bias the grafted seedling 103 that has been fastened in a direction away from the pushing member 35 by an elastomeric force as with the spring member 208. This configuration prevents the rotating table 20 from rotating in a state where the grafted seedling 103 after fastened remains in the space of the pushing member 35, and prevents excessive force from being applied to the grafted seedling 103.

Figure 24:
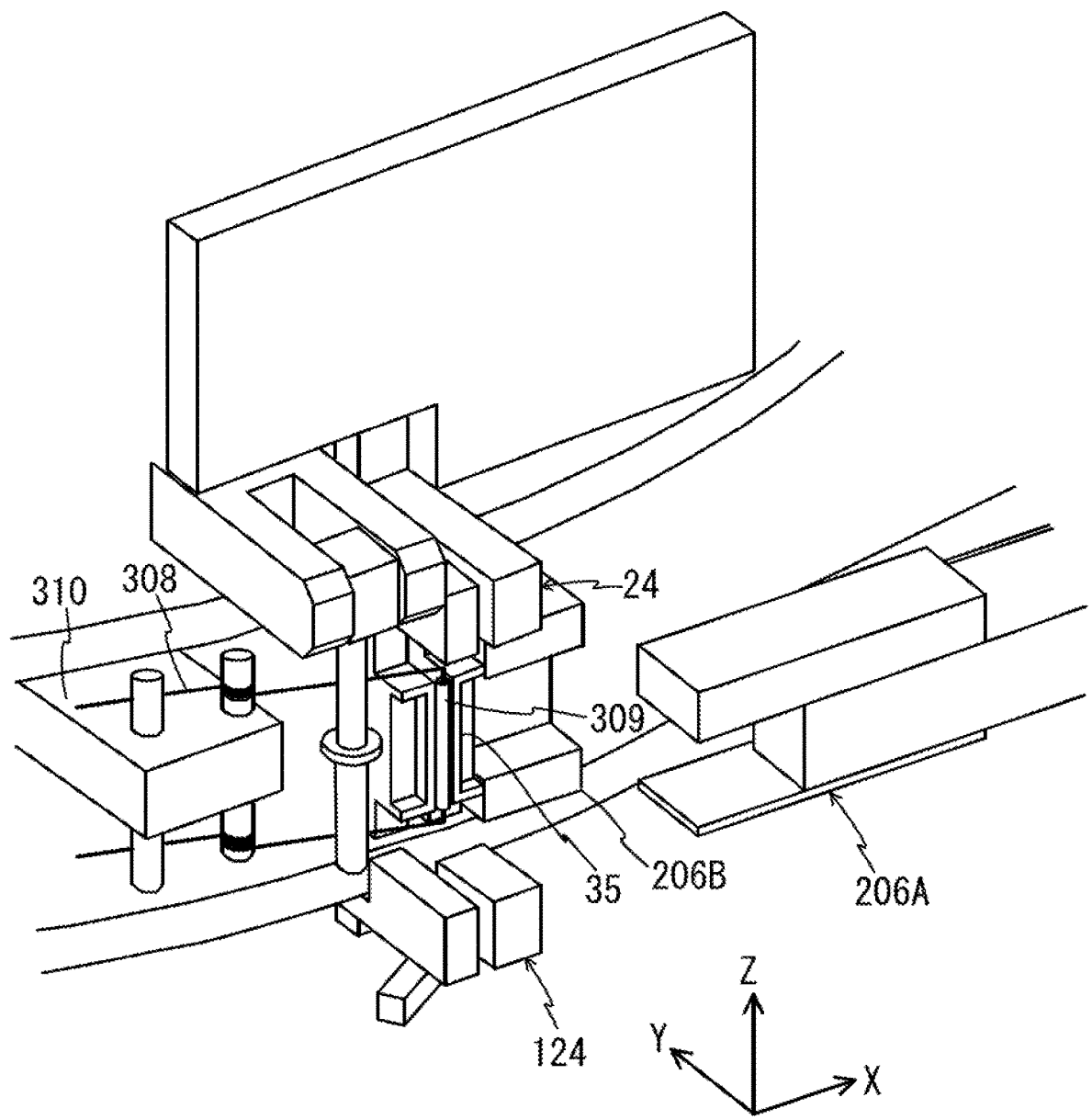
FIG. 24 illustrates an example in which an elastic member and a roll member are used as the biasing member.

Instead of the torsion springs 308A and 308B, as illustrated in FIG. 24, an elastic member 308 in which torsion springs are formed near a first end and a second end by bending a wire in a U-shape may be used as an biasing member. In this case, a part of the elastic member 308 is configured to be in the space of the pushing member 35, and a roll member 309 is located in the part of the elastic member 308 (the part that is in the space of the pushing member 35). The provision of the roll member 309 allows the elastomeric force of the elastic member 308 to be effectively transmitted to the grafted seedling 103.

Furthermore, in the first variation, as illustrated in FIG. 21 and FIG. 22, the force applying portion 34 of the hold mechanism 24 located on the upper table 26A includes a pushing plate 202, and the second hold portion 29B of the hold mechanism 124 located on the lower table 26B includes an extruded rod 204. The force applying portion 34 and the pushing plate 202 may be separate members, or the pushing plate 202 and the force applying portion 34 may be integrally formed.

Figure 25:
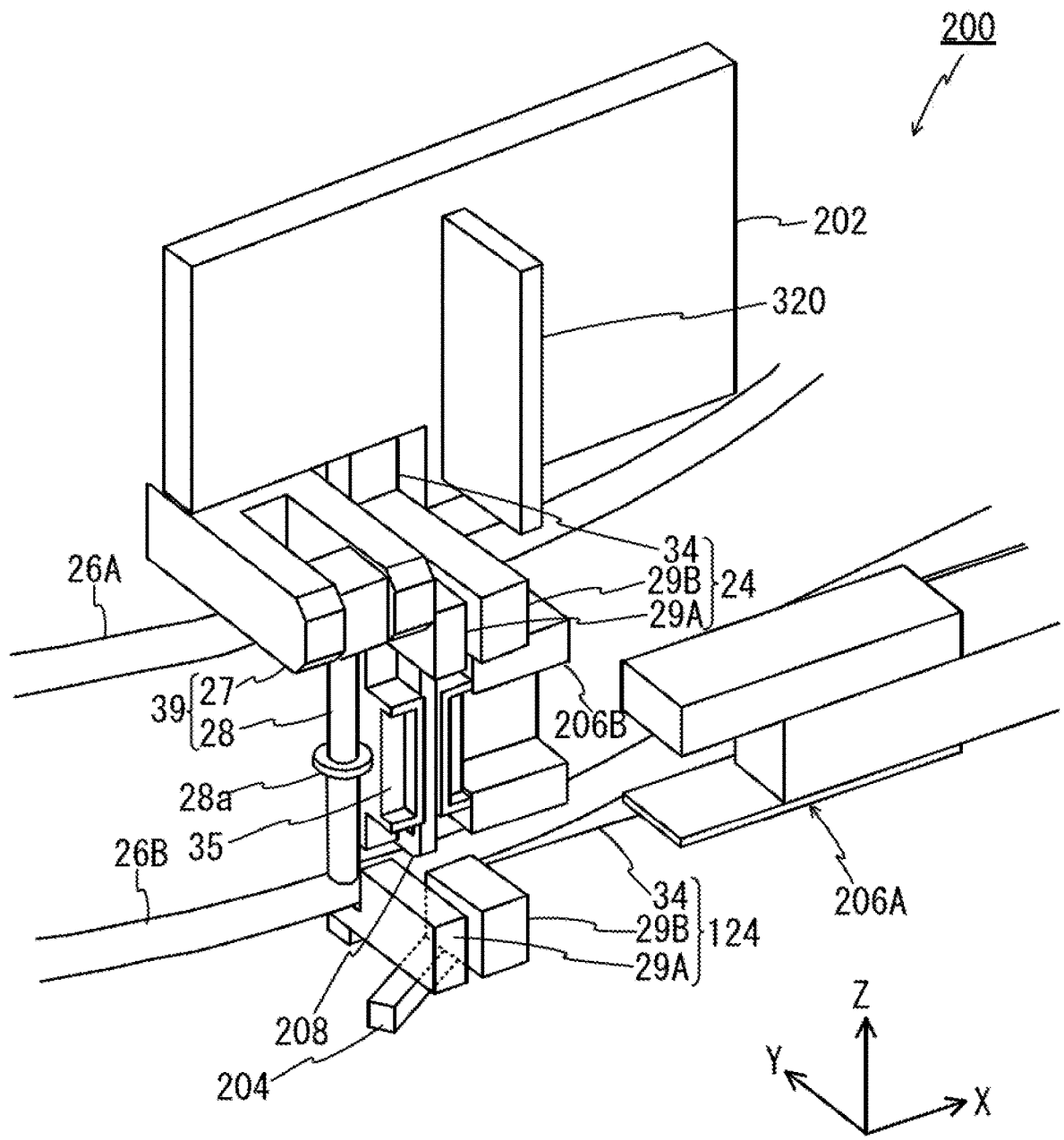
FIG. 25 illustrates an example in which a plate-like member is provided to a pushing plate.

As in the above embodiment, the hold release unit 50 pushes the contact portions 56A and 56B against the force applying portions 34 of the hold mechanisms 24 and 124 at the position of 7 o'clock (at the position of (D) in FIG. 1) from the −Y side to release a hold of the grafted seedling 103 by the hold mechanisms 24 and 124. In this case, a change in orientation of the force applying portion 34 of the hold mechanism 24 changes the orientation of the pushing plate 202, and the pushing plate 202 pushes the graft 102 to the outside of the hold mechanism 24. Additionally, as the second hold portion 29B of the hold mechanism 24 opens, the orientation of the extruded rod 204 changes, and the extruded rod 204 pushes the rootstock 104 to the outside of the hold mechanism 124. This configuration makes the grafted seedling 103 after fastened easily fall onto the conveyor 60 at the position of 7 o'clock. Additionally, since the pushing plate 202 is located at the hold mechanism 24 side, the part located above the pushing plate 202 of the hold mechanism 24 can effectively press the whole of the graft 102 including leaves to the outside. This configuration inhibits the graft 102 and the leaves of the graft 102 from being stuck with the hold mechanism 24 when the grafted seedling 103 is ejected. However, instead of the pushing plate 202 of the hold mechanism 24, an extruded rod similar to the extruded rod 204 may be provided. As illustrated in FIG. 25, a plate-like member 320 for preventing the spread of leaves of the graft 102 may be provided to the pushing plate 202. This structure prevents the leaves of the graft 102 from spreading to the side opposite to the hold mechanism 24 of the plate-like member 320 (the location in which the contact portion 56A comes in contact). Accordingly, when the grafted seedling 103 is ejected, the leaves of the graft 102 are prevented from being sandwiched between the pushing plate 202 and the contact portion 56A of the hold release unit 50, and the grafted seedling 103 is prevented from being damaged. As in the first variation, by providing the pushing plate 202, when a graft is manually set on the hold mechanism 24, a worker can easily open the hold mechanism 24 by pressing the pushing plate 202 by the hand holding the graft 102.

The grafting device 200 of the first variation may not necessarily include at least one of the annular member 28a, the spring member 208, the torsion springs 308A and 308B, the pushing plate 202, and the extruded rod 204.

(Second Variation)

Figure 26:
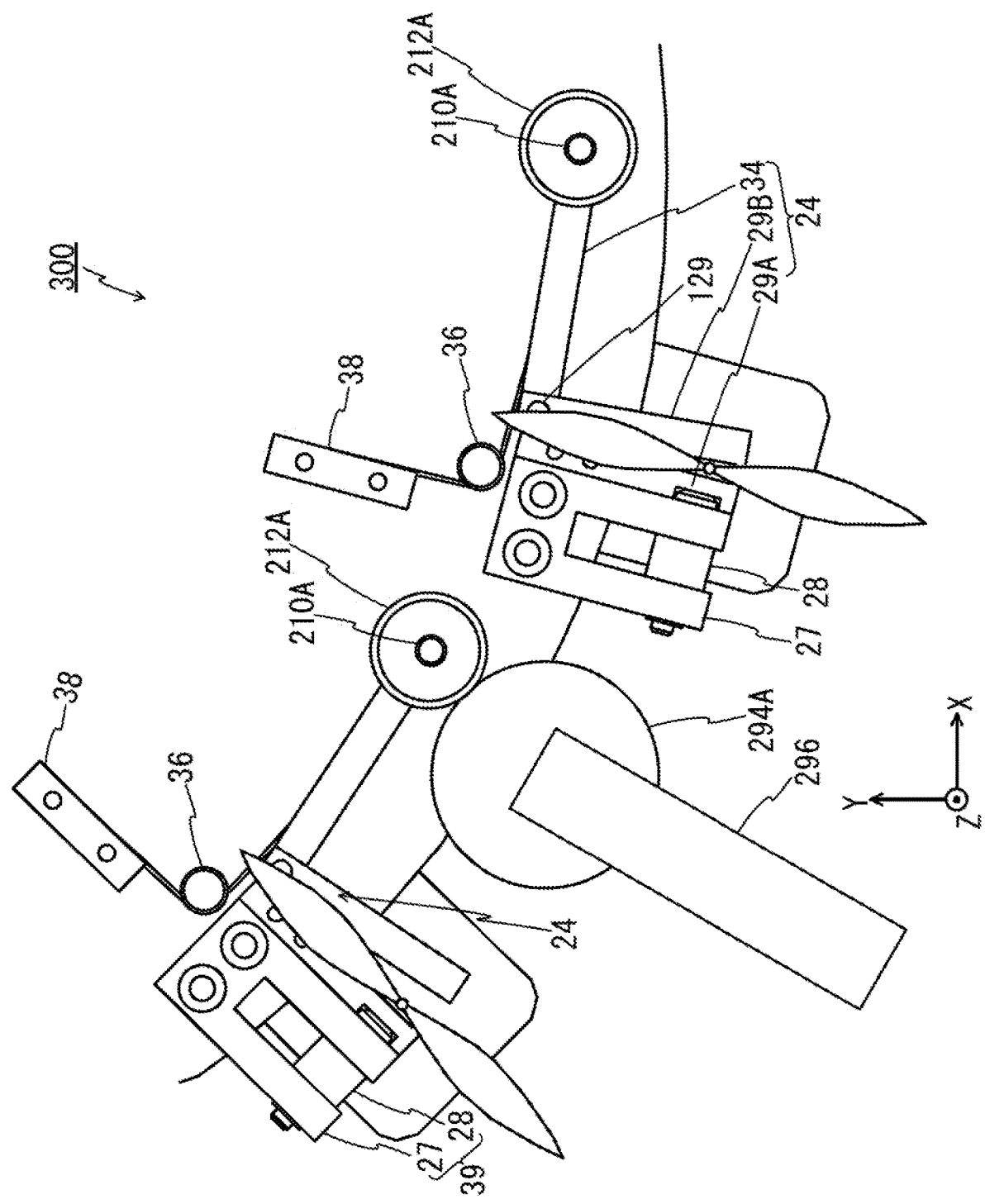
FIG. 26 is a plan view illustrating a part of a grafting device in accordance with a second variation.
Figure 27:
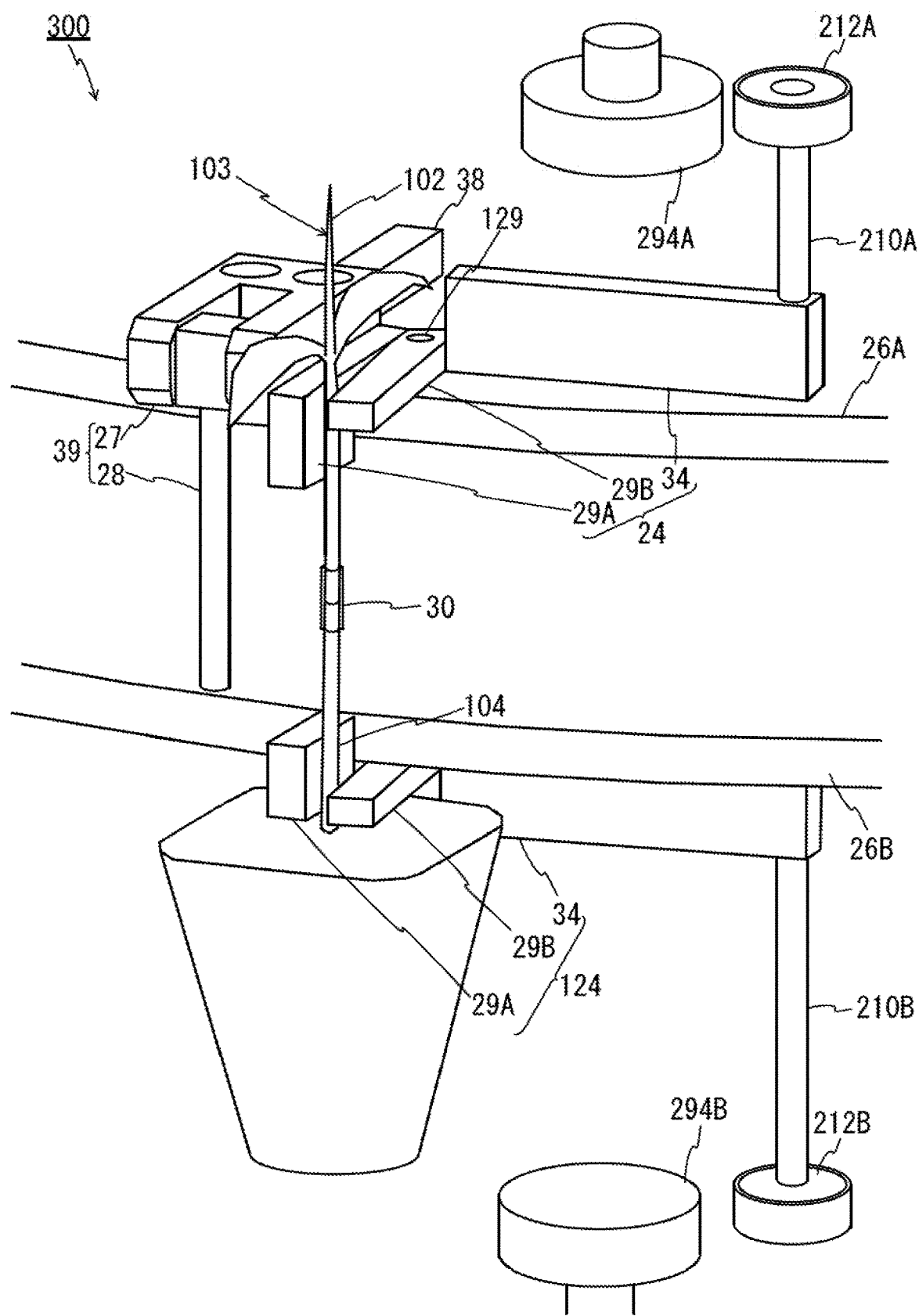
FIG. 27 is a perspective view illustrating a part of the grafting device of the second variation.

FIG. 26 is a plan view illustrating a part (near the position of 6 o'clock (the position of (C) in FIG. 1) and the position of 7 o'clock) of a grafting device 300 in accordance with a second variation, and FIG. 27 is a perspective view illustrating a part (near the position of 7 o'clock) of the grafting device 300 in accordance with the second variation. As illustrated in FIG. 27, in the second variation, a rotating body 212A is located on the upper surface of the force applying portion 34, through a shaft member 210A, of the hold mechanism 24 located on the upper table 26A, and a rotating body 212B is located on the lower surface of the force applying portion 34, through a shaft member 210B, of the hold mechanism 124 located on the lower table 26B. The rotating bodies 212A and 212B can rotate around the Z-axis centering around the shaft members 210A and 210B. At around the position of 7 o'clock, a contact member 294A with which the rotating body 212A comes in contact and a contact member 294B with which the rotating body 212B comes in contact are provided. The contact members 294A and 294B have a roller shape, and are supported by support members 296 (see FIG. 26). The positions of the contact members 294A and 294B are fixed to the positions in which the contact members 294A and 294B do not come in contact with anything except the rotating bodies 212A and 212B. A material having a high friction coefficient (such as, for example, rubber) may be provided on the surfaces of the contact members 294A and 294B so that the rotating bodies 212A and 212B being in contact with the rotating bodies 212A and 212B easily rotate in the Z-axis direction.

In the second variation, as illustrated in FIG. 26, the rotating body 212A provided to the hold mechanism 24 comes in contact with the contact member 294A at around the position of 7 o'clock. Then, as the rotating body 212A moves along the outer periphery of the contact member 294A while rotating, the force applying portion 34 of the hold mechanism 24 is pressed, and a hold of the grafted seedling 103 by the hold mechanism 24 is released. The rotating body 212B provided to the hold mechanism 124 comes in contact with the contact member 294B at around the position of 7 o'clock. Then, as the rotating body 212B moves along the outer periphery of the contact member 294B while rotating, the force applying portion 34 of the hold mechanism 124 is pushed, and a hold of the grafted seedling 103 by the hold mechanism 124 is released. Also in the second variation, the positions of the contact members 294A and 294B can be adjusted so that the timing when the hold mechanism 24 releases the hold is earlier than the timing when the hold mechanism 124 releases the hold.

In the second variation, unlike the hold release mechanism 51 of the above embodiment, the hold by the hold mechanisms 24 and 124 can be released at an appropriate timing without using a driving mechanism such as the hold release electrically-driven slider 52. In this case, it is unnecessary to use an electric motor or the like to release the hold by the hold mechanisms 24 and 124. Thus, a cost is reduced. A case where the contact members 294A and 294B have roller shapes has been described, but this does not intend to suggest any limitation. The contact members 294A and 294B may have other shapes (e.g., plate-like shape) as long as they come in contact with the rotating bodies 212A and 212B.

The first variation and the second variation can be appropriately combined.

Figure 28:
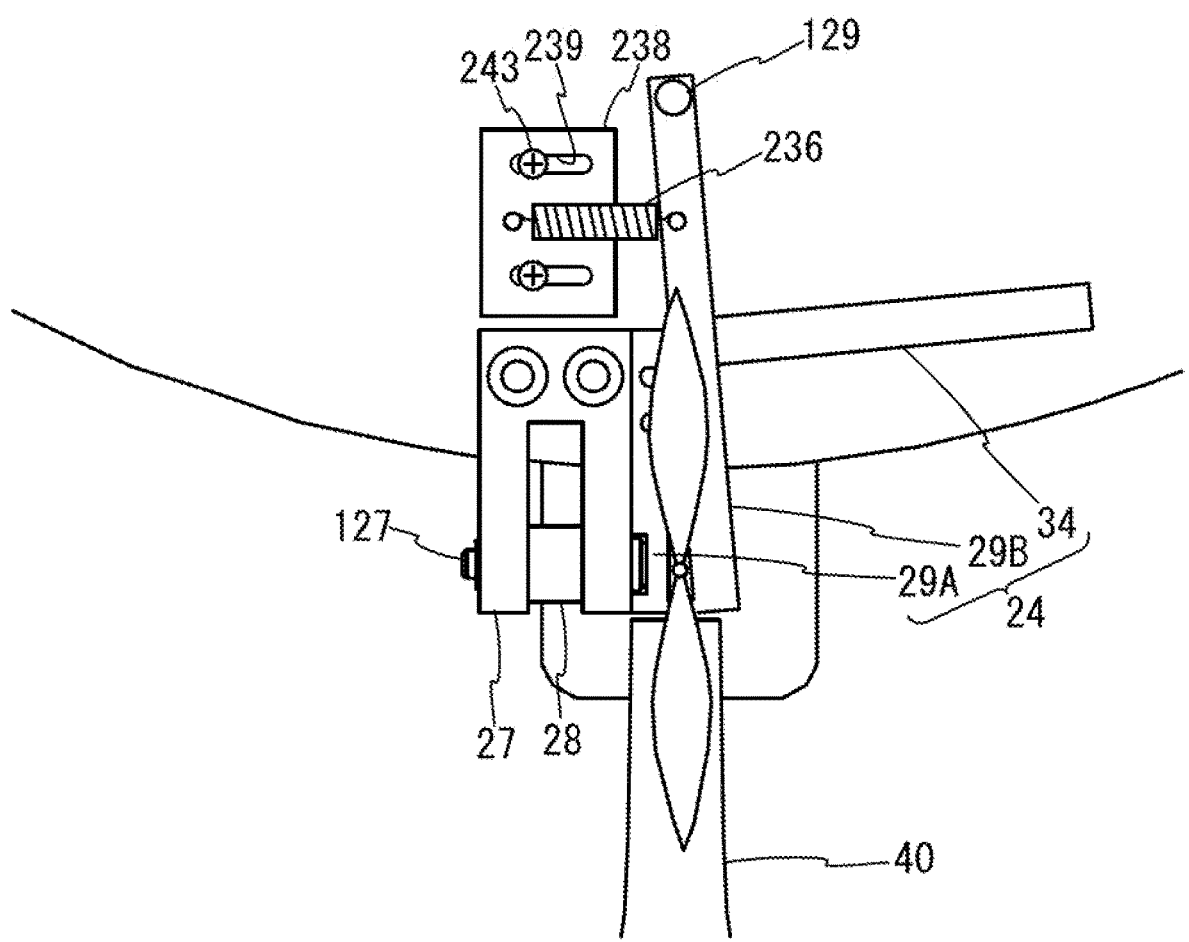
FIG. 28 illustrates an example in which a force applying unit and a second hold unit are biased by the elastomeric force of a helical extension spring.

In FIG. 5, a case where a force in the clockwise direction centering around the shaft 129 is applied to the force applying portion 34 and the second hold portion 29B by the elastomeric force of the torsion spring 36 has been described, but this does not intend to suggest any limitation. For example, as illustrated in FIG. 28, a force in the clockwise direction centering around the shaft 129 may be applied to the force applying portion 34 and the second hold portion 29B by the elastomeric force of a helical extension spring 236. In the example of FIG. 28, a first end of the helical extension spring 236 is connected to the second hold portion 29B, and a second end of the helical extension spring 236 is connected to a fixed base 238 fixed on the upper surface of the upper table 26A. In this case, a long hole 239 is formed in the fixed base 238, and the fixed position of the fixed base 238 is adjusted by changing the positional relationship between a screw 243 used to fix the fixed base 238 to the upper table 26A and the long hole 239. This configuration enables to adjust an applied force by the helical extension spring 236. When it is unnecessary to adjust an applied force by the helical extension spring 236, the long hole 239 may not be necessarily provided to the fixed base 238. Alternatively, a first end of the helical extension spring 236 may be directly connected to the upper table 26A. The same structure may be applied to the lower table 26B.

In the above embodiment and variations, the first hold portion 29A of the hold mechanism 24 may be omitted, and the fixed member 27 of the tape pull-out mechanism 39 may serve a function of the first hold portion 29A. That is, the graft 102 may be held by the fixed member 27 and the second hold portion 29B.

Figure 29:
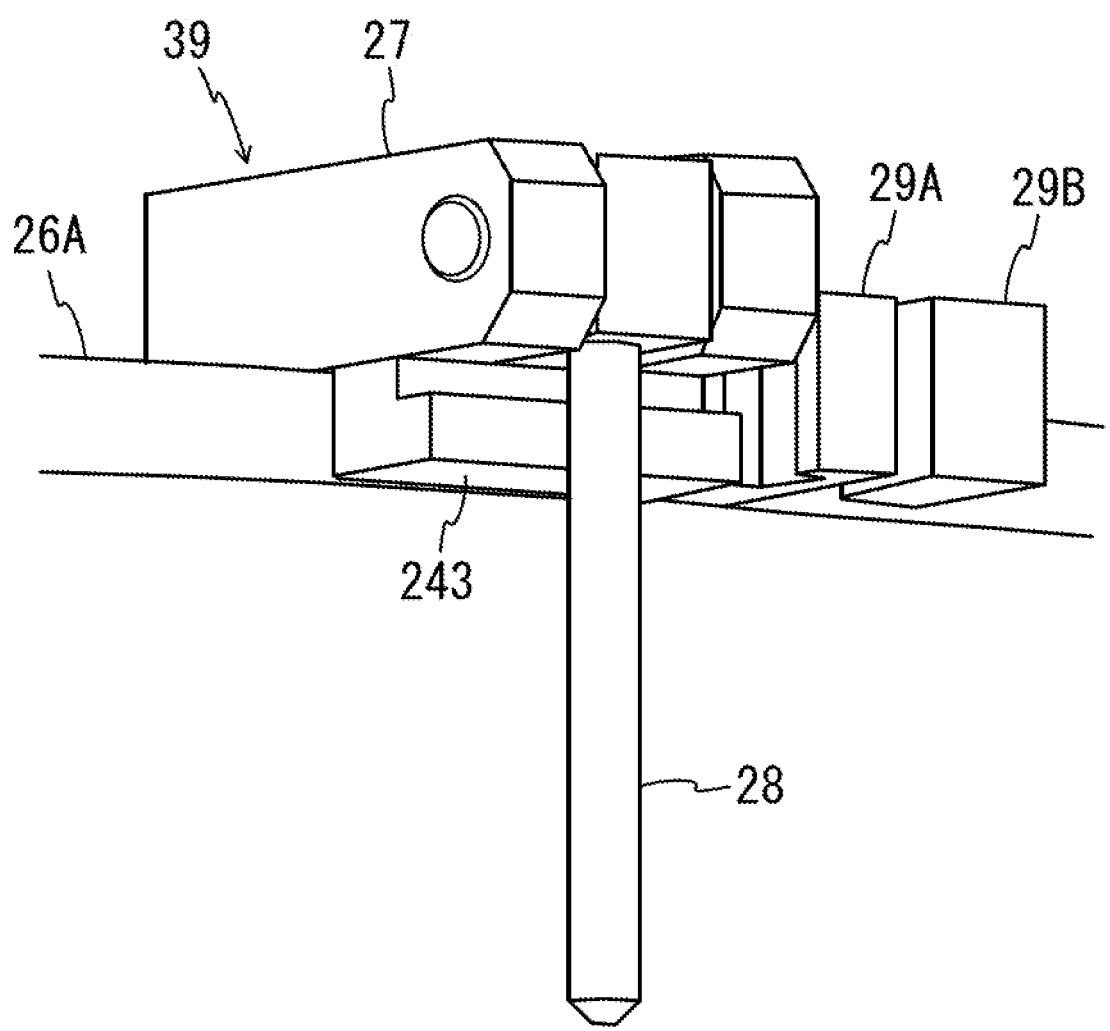
FIG. 29 illustrates an example in which a stopper member is provided on the lower surface of a fixed member of the tape pull-out mechanism.

As illustrated in FIG. 29, a blockish stopper member 243 having an L-shaped cross-section may be located on the lower surface of the fixed member 27 of the tape pull-out mechanism 39. The stopper member 243 prevents the pin 28 from rotating toward the center of the rotating table 20 from the vertical position. This prevents the pin 28 from swinging toward the center of the rotating table 20 when the rotating table 20 rotates or when the thermoplastic resin tape 30 is welded. FIG. 29 illustrates a case where the stopper member 243 is provided to the fixed member 27, but the stopper member 243 may be fixed to the upper table 26A.

While the exemplary embodiments of the present invention have been illustrated in detail, the present invention is not limited to the above-mentioned embodiments, and other embodiments, variations and variations may be made without departing from the scope of the present invention.

DESCRIPTION OF LETTERS OR NUMERALS 20 rotating table (transfer unit)
24, 124 hold mechanism (hold unit)
26A upper table (rotating table)
26B lower table (rotating table)
28 pin (pull-out member)
28a annular member (restriction mechanism)
30 thermoplastic resin tape (tape)
31, 32 tape supply device (tape supply unit)
35 pushing member
40 welding machine (part of a welding unit)
100 grafting device
102 graft
103 grafted seedling
104 rootstock
120 rotating shaft
127 rocking shaft (part of displacing mechanism)
198 cover member (part of displacing mechanism, guide unit)
206A, 206B guide member (restriction mechanism)
208 spring member (biasing member)

The invention claimed is:

1. A grafting device comprising:
a transfer unit which defines a transfer path, the transfer unit having a hold unit arranged on the transfer path, the hold unit being configured to hold and transfer, on the transfer path from a first position to a second position, a grafted seedling that is in a state where a cut surface of a graft and a cut surface of a rootstock are closely attached to each other;
a tape supply unit configured to arrange a tape in a location between the first position and the second position in such a manner that the tape crosses the transfer path of the grafted seedling and the tape is allowed to be pulled out from the tape supply unit;
a pull-out member located anterior to the hold unit in a transfer direction of the grafted seedling so as to move along with the hold unit ahead of the grafted seedling on the transfer path of the grafted seedling, the pull-out member being configured to pull out the tape from the tape supply unit by moving along the transfer path without gripping the tape such that the pull-out member is positioned between the pulled-out tape and the grafted seedling in the transfer direction while bending the tape so as to form a first part and a second part of the tape, the first part facing the second part, such that a closely attached part of the grafted seedling is sandwiched between the first part of the tape and the second part of the tape; and
a welding unit configured to cover a periphery of the closely attached part of the grafted seedling with the tape and weld the tape,
wherein the hold unit holds the graft and the rootstock so that an axial direction of the graft and an axial direction of the rootstock are in a vertical direction.

2. The grafting device according to claim 1, wherein:
wherein tape supply unit is configured to arrange a tape that is a thermoplastic resin film, and
the welding unit is configured to ultrasonically weld the tape.

3. The grafting device according to claim 2, further comprising:
a pushing member configured to sandwich the tape between the welding unit and the pushing member when the welding unit ultrasonically welds the tape; and
a biasing member configured to bias the grafted seedling covered with the tape in a direction away from the pushing member.

4. The grafting device according to claim 1, further comprising
a displacing mechanism configured to temporarily displace the pull-out member from the transfer path of the grafted seedling.

5. The grafting device according to claim 4, wherein:
the pull-out member is swingable so as to be in an orientation allowing displacement from the transfer path of the grafted seedling, and
the displacing mechanism includes a guide unit that guides the pull-out member so that the pull-out member swings at a predetermined position.

6. The grafting device according to claim 1, further comprising:
a restriction mechanism that is located to the pull-out member or near the pull-out member, and is configured to restrict a direction in which the tape is pulled out by the pull-out member.

7. The grafting device according to claim 1, wherein the welding unit is configured to cut a welded part of a tape at a same time as welding.

8. The grafting device according to claim 1, wherein the pull-out member is configured to apply a predetermined tension to a tape pulled out from the tape supply unit.

9. The grafting device according to claim 1, wherein after welding by the welding unit, the hold unit releases a hold of the graft, and then releases a hold of the rootstock.

10. The grafting device according to claim 1, wherein the pull-out member includes a pin that transfers through the transfer path in advance of the grafted seedling and that is configured to pull out the tape from the tape supply unit with tape forming a substantially U-shape around the pin.

11. The grafting device according to claim 10, further comprising
a tape made of thermoplastic resin on the transfer path of the grafted seedling that is configured to be pulled out from the tape supply unit by the pin of the pull-out member to form a substantially U-shape around the pin with a closely attached part of the grafted seedling sandwiched between a first side of the U-shape and a second side of the U-shape.

12. The grafting device according to claim 10, further including:
means for moving the pin ahead of the grafted seedling on the transfer path of the grafted seedling and for causing the pin to contact and pull out the tape from the tape supply unit such that the tape sandwiches the closely attached part of the grafted seedling between the first part of the tape and the second part of the tape, wherein the first part of the tape and the second part of the tape are parts of the same piece of tape pulled out by the pull-out member.

13. A grafting device comprising:
a rotating table configured to rotate around a rotating shaft;
a hold unit arranged at an outer peripheral portion of the rotating table and configured to move on a transfer path along the outer peripheral portion, hold and transfer a graft and a rootstock on the transfer path when the rotating table rotates, an axial direction of the graft and an axial direction of the rootstock intersecting with a plane including a top face of the rotating table;
a tape supply unit configured to arrange a tape made of thermoplastic resin in a location between a first position and a second position of the transfer path of a grafted seedling that is in a state where cut surfaces of the graft and the rootstock are closely attached to each other in such a manner that the tape crosses the transfer path of the grafted seedling and is allowed to be pulled out from the tape supply unit;
a sandwiching mechanism configured to bend the tape pulled from the tape supply unit at a location ahead of the grafted seedling tape on the transfer path before the grafted seedling comes in contact with the tape while forming a first part and a second part of the tape, the first part facing the second part, and then sandwich a closely attached part of the grafted seedling between the first part of the tape and the second part of the tape; and
a welding unit configured to ultrasonically weld the first part and the second part of the tape to cover a periphery of the closely attached part of the grafted seedling,
wherein the sandwiching mechanism includes a pull-out member that is located anterior to the hold unit in a rotational direction and is configured to pull out the tape from the tape supply unit by moving along the transfer path without gripping the tape in such a manner that the pull-out member is positioned between the pulled-out tape and the grafted seedling in the transfer direction as the rotating table rotates.

14. The grafting device according to claim 13, further comprising:
a pushing member configured to sandwich the tape between the welding unit and the pushing member when the welding unit ultrasonically welds the tape; and
a biasing member configured to bias the grafted seedling covered with the tape in a direction away from the pushing member.

15. The grafting device according to claim 13, further comprising
a displacing mechanism configured to temporarily displace the pull-out member from the transfer path of the grafted seedling.

16. The grafting device according to claim 13, further comprising:
a restriction mechanism that is located to the pull-out member or near the pull-out member, and is configured to restrict a direction in which the tape is pulled out by the pull-out member.

17. The grafting device according to claim 13, wherein the welding unit is configured to cut a welded part of a tape at a same time as welding.

18. The grafting device according to claim 13, wherein the pull-out member is configured to apply a predetermined tension to a tape pulled out from the tape supply unit.

19. The grafting device according to claim 13, wherein after welding by the welding unit, the hold unit releases a hold of the graft, and then releases a hold of the rootstock.

20. The grafting device according to claim 13, wherein the pull-out member includes a pin that transfers through the transfer path in advance of the grafted seedling as the rotating table rotates and that is configured to pull out the tape from the tape supply unit with tape forming a substantially U-shape around the pin.

21. The grafting device according to claim 20, further comprising
a tape made of thermoplastic resin on the transfer path of the grafted seedling that is configured to be pulled out from the tape supply unit by the pin of the pull-out member to form a substantially U-shape around the pin with a closely attached part of the grafted seedling sandwiched between a first side of the U-shape and a second side of the U-shape.

22. The grafting device according to claim 20, further including:
means for moving the pin ahead of the grafted seedling on the transfer path of the grafted seedling and for causing the pin to contact and pull out the tape from the tape supply unit such that the tape sandwiches the closely attached part of the grafted seedling between the first part of the tape and the second part of the tape, wherein the first part of the tape and the second part of the tape are parts of the same piece of tape pulled out by the pull-out member.

23. A grafting device comprising:
a transfer unit configured to transfer, from a first position to a second position, a grafted seedling that is in a state where a cut surface of a graft and a cut surface of a rootstock are closely attached to each other;
a tape supply unit configured to arrange a tape in a location between the first position and the second position in such a manner that the tape crosses a transfer path of the grafted seedling and the tape is allowed to be pulled out from the tape supply unit;
a pull-out member configured to move ahead of the grafted seedling on the transfer path of the grafted seedling to pull out the tape from the tape supply unit by moving along the transfer path without gripping the tape in such a manner that the pull-out member is positioned between the pulled-out tape and the grafted seedling in the transfer direction, bend the tape so as to form a first part of the tape and a second part of the tape, and sandwich a closely attached part of the grafted seedling between the first part of the tape and the second part of the tape, the second part facing the first part which in part overlap each other at a periphery of the closely attached part of the grafted seedling so as to form an overlapped part of the tape;
a welding unit configured to cover the periphery of the closely attached part of the grafted seedling with the tape and weld the tape; and
a pushing member that is opposite to the welding unit across the grafted seedling such that the overlapped part of the first part and the second part of the tape are sandwiched between the pushing member and the welding unit to weld and cut the overlapped part of the first and second parts of the tape at the periphery of the closely attached part of the grafted seedling while the tape remains connected in such a manner that the tape crosses the transfer path of the grafted seedling,
wherein the transfer unit includes a first hold unit that holds a first part of the graft by grasping the first part of the graft and a second hold unit that holds a second part of the rootstock by grasping the second part of the rootstock so that an axial direction of the graft and an axial direction of the rootstock are in a vertical direction, the first part being located higher than the closely attached part in the vertical direction, the second part being located lower than the closely attached part in the vertical direction, the first part being different from the second part,
wherein the pull-out member is located anterior to the hold unit in a transfer direction of the hold unit, and
wherein the pushing member and the welding unit sandwiches the tape when the welding unit welds the tape.

24. A grafting device comprising:
a rotating table configured to rotate around a rotating shaft;
a first hold unit configured to hold a graft in an outer peripheral portion of the rotating table and a second hold unit configured to hold a rootstock in the outer peripheral portion of the rotating table, an axial direction of the graft and an axial direction of the rootstock intersecting with a plane including a top face of the rotating table;
a tape supply unit configured to arrange a tape made of thermoplastic resin in a location between a first position and a second position of a transfer path of a grafted seedling that is in a state where cut surfaces of the graft and the rootstock are closely attached to each other in such a manner that the tape crosses the transfer path of the grafted seedling and the tape is allowed to be pulled out from the tape supply unit;
a sandwiching mechanism configured to bend the tape pulled from the tape supply unit so as to form a first part of the tape and a second part of the tape and sandwich a closely attached part of the grafted seedling between the first part of the tape and the second part of the tape, the second part facing first part which in part overlap each other at a periphery of the closely attached part of the grafted seedling so as to form an overlapped part of the tape;
a welding unit configured to ultrasonically weld the first part and the second part of the tape at the periphery of the closely attached part of the grafted seedling; and
a pushing member that is opposite to the welding unit across the grafted seedling such that the overlapped part of the first part and the second part of the tape are sandwiched between the pushing member and the welding unit to weld and cut the overlapped part of the first and second parts of the tape at the periphery of the closely attached part of the grafted seedling while the tape remains connected in such a manner that the tape crosses the transfer path of the grafted seedling,
wherein the first hold unit holds a first part, which is located higher than the closely attached part in the axial direction, of the graft, and the second hold unit holds a second part, which is located lower than the closely attached part in the axial direction, of the rootstock,
wherein the sandwiching mechanism includes a pull-out member that is located anterior to the hold unit in a rotational direction and pulls out the tape from the tape supply unit by moving along the transfer path without gripping the tape in such a manner that the pull-out member is positioned between the pulled-out tape and the grafted seedling in the transfer direction as the rotating table rotates, and
wherein the pushing member and the welding unit sandwiches the tape when the welding unit welds the tape.

* * * * *